(12) United States Patent
Ha et al.

(10) Patent No.: US 12,325,137 B2
(45) Date of Patent: Jun. 10, 2025

(54) ROBOT AND METHOD FOR CONTROLLING THE SAME

(71) Applicant: Samsung Electronics Co., Ltd., Suwon-si (KR)

(72) Inventors: Jihoon Ha, Suwon-si (KR); Taegyu Kim, Suwon-si (KR); Jinwook Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 249 days.

(21) Appl. No.: 17/994,225

(22) Filed: Nov. 25, 2022

(65) Prior Publication Data

US 2023/0286154 A1    Sep. 14, 2023

Related U.S. Application Data

(63) Continuation of application No. PCT/KR2022/017622, filed on Nov. 10, 2022.

(30) Foreign Application Priority Data

Mar. 11, 2022    (KR) ........................ 10-2022-0030566

(51) Int. Cl.
| | | |
|---|---|---|
| *B25J 9/16* | (2006.01) | |
| *A47L 9/28* | (2006.01) | |
| *B25J 9/00* | (2006.01) | |
| *B25J 11/00* | (2006.01) | |

(52) U.S. Cl.
CPC .......... *B25J 9/1666* (2013.01); *B25J 9/0009* (2013.01); *B25J 11/0085* (2013.01); *A47L 9/2826* (2013.01); *A47L 2201/06* (2013.01)

(58) Field of Classification Search
CPC .... B25J 9/1666; B25J 9/0009; B25J 11/0085; A47L 9/2826; A47L 2201/06
See application file for complete search history.

(56) References Cited

U.S. PATENT DOCUMENTS

| | | |
|---|---|---|
| 9,212,938 B2 | 12/2015 | Etherington et al. |
| 9,267,833 B2 | 2/2016 | Ohmiya et al. |
| 11,452,423 B2 | 9/2022 | Kim et al. |
| 2018/0368642 A1* | 12/2018 | Son .................... G01B 11/22 |

(Continued)

FOREIGN PATENT DOCUMENTS

| | | | |
|---|---|---|---|
| DE | 102012108008 A1 * | 3/2014 | .......... A47L 9/2826 |
| JP | 2004-020518 A | 1/2004 | |
| JP | 2005-211497 A | 8/2005 | |

(Continued)

OTHER PUBLICATIONS

International Search Report and written opinion dated on Feb. 20, 2023, issued in International Application No. PCT/KR2022/017622.

*Primary Examiner* — Basil T. Jos
*Assistant Examiner* — Christopher Scott
(74) *Attorney, Agent, or Firm* — Jefferson IP Law, LLP

(57) ABSTRACT

A robot or a cleaning robot is provided. The robot includes a housing forming an external appearance of the robot, a cover configured to be coupled at a lowermost part of the housing, and at least one or more sensor structures positioned between the housing and the cover. The sensor structure includes a conductive plate and a sensor electrode on the conductive plate.

20 Claims, 20 Drawing Sheets

(56) References Cited

U.S. PATENT DOCUMENTS

2020/0230806 A1    7/2020  Choi
2021/0121032 A1*  4/2021  Kim ...................... A47L 9/2852

FOREIGN PATENT DOCUMENTS

| | | | | |
|---|---|---|---|---|
| JP | 2009-092460 | A | | 4/2009 |
| JP | 2015-054185 | A | | 3/2015 |
| JP | 2018-143649 | A | | 9/2018 |
| JP | 6994234 | B2 | | 1/2022 |
| JP | 2022025678 | A | * | 2/2022 |
| KR | 10-2011-0119196 | A | | 11/2011 |
| KR | 10-2015-0143209 | A | | 12/2015 |
| KR | 20150143209 | A | * | 12/2015 |
| KR | 10-2017-0047790 | A | | 5/2017 |
| KR | 20170047790 | A | * | 5/2017 |
| KR | 10-2019-0000894 | A | | 1/2019 |
| KR | 10-1943811 | B1 | | 1/2019 |
| KR | 10-2019-0014371 | A | | 2/2019 |
| KR | 10-1957133 | B1 | | 3/2019 |
| KR | 10-2020-0094817 | A | | 8/2020 |
| KR | 10-2329298 | B1 | | 11/2021 |

* cited by examiner

ROBOT AND METHOD FOR CONTROLLING THE SAME

CROSS REFERENCE TO RELATED APPLICATION(S)

This application is a continuation application, claiming priority under § 365(c), of an International application No. PCT/KR2022/017622, filed on Nov. 10, 2022, which is based on and claims the benefit of a Korean patent application number 10-2022-0030566, filed on Mar. 11, 2022, in the Korean Intellectual Property Office, the disclosure of which is incorporated by reference herein in its entirety.

BACKGROUND

The disclosure relates to a robot and a method for controlling the same.

DESCRIPTION OF RELATED ART

A robot refers to a machine that may be programmed with a computer to automatically perform a series of complicated human tasks. The robot may perform a series of operations with an external and/or internal controller. Recently, many robots are also being applied to home appliances, and they may be generally classified into mobile robots and stationary robots depending on whether such a robot can drive for itself. A mobile robot may generally include various sensors and travel within a certain space according to a preset algorithm based on detected information. The mobile robot may include, for example, an assistant robot, a cleaning robot, a pet-care robot, and the like, but the disclosure is not limited thereto. In the meantime, since the mobile robot may travel for itself without any manual manipulation by a user, it may come into contact with contaminants while moving, therefore making the contaminants spread along its moving path here and there.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a mobile robot capable of preventing the spread of contaminants, in particular, liquid contaminants according to moving of the robot.

Another aspect of the disclosure is to provide a sensor assembly capable of detecting a change in capacitance without exposing an electrode surface of a sensor to the outside of the robot, and a structure of the robot coupled to the sensor assembly.

Additional aspects will be set forth in part in the description which follows and, in part, will be apparent from the description, or may be learned by practice of the presented embodiments.

In accordance with an aspect of the disclosure, a robot is provided. The robot includes a housing forming an external appearance of the robot, a cover configured to be coupled at a lowermost part of the housing, and two or more sensor structures coupled to the cover and positioned between the housing and the cover, wherein each sensor structure of the two or more sensor structures comprises a conductive plate and a sensor electrode, and the cover comprises a receiving part for positioning the two or more sensor structures in between the cover and the housing. Here, the sensor electrode may be positioned on the conductive plate.

According to an embodiment, the receiving part may be provided to correspond to a total number of the two or more sensor structures, and at least a portion of the receiving part may be positioned at the center of the cover.

According to an embodiment, the receiving part may comprise a protecting surface extending downwards from the cover, and a supporting surface having a predetermined angle with respect to the protecting surface, and the two or more sensor structures may be positioned on the supporting surface.

According to an embodiment, at least a portion of the receiving part may comprise a supporting surface parallel to a moving direction of the robot, and the two or more sensor structures may be positioned on the supporting surface.

According to an embodiment, the receiving part may include a recess and a projection for fixing the sensor structure, and the conductive plate may be fastened to an inside of the receiving part by the recess and the projection.

According to an embodiment, the robot may further comprise at least one wheel and a drive system connected to the wheel to provide a rotational force to the wheel, and the one or more sensor structures may be arranged to be spaced apart from each other in a row along a virtual horizontal reference line orthogonal to a moving reference line connecting a front side and a rear side of the robot.

According to an embodiment, the cover may include an opening at least partially exposing an inner module (e.g., a cleaning tool) to the outside, and the inner module may be introduced between the cover and the housing.

According to an embodiment, the cover may include at least one guide having a shape protruding downwardly of the cover, and the at least one guide and the receiving part may be alternatingly arranged.

According to an embodiment, the robot may comprise a memory storing at least one program, and a processor executing at least one instruction of the program, wherein the processor is configured to perform at least one of detecting contaminants on a front floor surface through the sensor structure, identifying at least one sensor structure that has detected the contaminants, and setting an entry-forbidden area based on at least one of a position or a number of the identified sensor structure.

According to an embodiment, the processor may be configured to perform at least one of when the contaminants are detected, moving backwards, identifying a sensing signal on a sensor structure that has detected the contaminants after moving backwards or while moving backwards, and when the sensing signal is identified from the sensor structure that has detected the contaminants, ceasing the moving, and when the sensing signal is no longer identified from the sensor structure that has detected the contaminants, resuming the moving so as not to pass the entry-forbidden area.

According to an embodiment, the processor may be configured to perform, when all of the plurality of sensor structures detect the contaminants in a front side of the robot, setting the entry-forbidden area and ceasing the moving.

According to an embodiment, the setting the entry-forbidden area may further comprise obtaining a virtual reference line for setting the entry-forbidden area, obtaining two or more residual virtual lines for generating a polygonal area using the virtual reference line, obtaining the polygonal area by connecting the virtual reference line and the residual virtual line, and setting an area corresponding to the polygonal area as the entry-forbidden area.

According to an embodiment, wherein, to obtain the virtual reference line, the processor is configured to identify two sensor structures of the two or more sensor structures that have detected the contaminants, and obtain the virtual reference line as a line between the identified two sensor structures.

According to an embodiment, wherein the processor, when executing the at least one instruction, is further configured to determine a length of the virtual reference line based on a distance between the identified two sensor structures.

In accordance with another aspect of the disclosure, a cleaning robot is provided. The cleaning robot includes a first housing forming an external appearance of a main body, a second housing coupled to a front of the first housing, a drive system coupled to both sides of the main body and configured to drive the cleaning robot, and a cleaning tool assembly configured to be coupled to a lower part of the second housing, wherein the cleaning tool assembly may comprise a cleaning tool, a cover connected to the cleaning tool, the cover having an opening for exposing at least part of the cleaning tool, and a sensor structure coupled to the cover and positioned between the cover and the housing, and wherein the sensor structure may comprise a conductive plate and a sensor electrode. Here, the sensor electrode may be positioned on the conductive plate.

According to an embodiment, the cover may comprise a receiving part for positioning the sensor structure in between the cover and the housing.

According to an embodiment, the cleaning robot may comprise a plurality of sensor structures and the receiving part may be provided to be arranged spaced apart from each other to correspond to a total number of the plurality of sensor structures.

According to an embodiment, the receiving part may comprise a protecting surface extending downwards from the cover and a supporting surface having a predetermined angle with respect to the protecting surface, and the sensor structure may be positioned on the supporting surface.

According to an embodiment, at least a portion of the receiving part may comprise a supporting surface parallel to a moving direction, and the sensor structure may be positioned on the supporting surface.

According to an embodiment, the receiving part may include a recess and a projection for fixing the sensor structure, and the conductive plate may be fastened to the inside of the receiving part by the recess and the projection.

According to an embodiment, the cleaning robot may further include a memory storing at least one program, and a processor executing at least one instruction of the program, wherein the processor may be configured to perform at least one of detecting contaminants on a front floor surface through the sensor structure, identifying the sensor structure that has detected the contaminants, and setting an entry-forbidden area based on at least one of a position or a number of the identified sensor structure.

In accordance with another aspect of the disclosure, a control method being performed by a robot or a cleaning robot comprising a housing forming an external appearance of a main body, a cover configured to be coupled at a lower side of the housing, and a plurality of sensor structures positioned between the housing and the cover is provided. The control method includes detecting contaminants on a front floor surface through at least one sensor structure of the plurality of sensor structures, identifying a sensor structure of the plurality of sensor structures that has detected the contaminants, and setting an entry-forbidden area based on at least one of a position or a number of the identified sensor structure.

According to an embodiment, the moving backwards when the contaminants are detected may comprise identifying a sensing signal on the sensor structure that has detected the contaminants after moving backwards or while moving backwards, and when the sensing signal is identified from the sensor structure detecting the contaminants, ceasing the moving, and when the sensing signal is no longer identified from the sensor structure that has detected the contaminants, resuming the moving so as not to pass the entry-forbidden area.

The control method according to an embodiment may comprise setting an entry-forbidden area when all of the two or more sensor structures detect contaminants in front, and stopping moving.

According to an embodiment, the setting an entry-forbidden area may comprise obtaining a virtual reference line for setting the entry-forbidden area, obtaining two or more residual virtual lines to generate a polygonal area using the virtual reference line, obtaining a polygonal area by connecting the virtual reference line and the residual virtual line, and setting an area corresponding to the polygonal area as the entry-forbidden area.

According to an embodiment, a length of the virtual reference line may be determined based on at least one of a position and/or a number of sensor structures that have detected contaminants.

According to an embodiment, the length of the virtual reference line may be determined with a sum of a distance between the sensor structures that detected contaminants (i.e., first length) and a distance between the sensor structure that detected the contaminants and its neighboring sensor structure that has not detected the contaminants (i.e., second length).

According to an embodiment, a length of the virtual reference line may be determined with a sum of a distance between the sensor structures that detected the contaminants (first length), a distance between the sensor structure that detected the contaminants and its neighboring sensor structure that has not detected the contaminants (second length), and a marginal distance (third length) extending in an outermost direction from the corresponding sensor structure in case where the sensor detecting the contaminants is a sensor structure located at the outermost side.

According to an embodiment, the length of the residual virtual line may be determined to be the same as the length of the virtual reference line.

According to an embodiment, the length of the residual virtual line may be determined to be related to the length of the virtual reference line.

The control method according to an embodiment may comprise obtaining two or more entry-forbidden areas, and merging the two or more entry-forbidden areas to obtain a final entry-forbidden area.

According to an embodiment, the obtaining two or more entry-forbidden areas may comprise obtaining a first entry-forbidden area in response to detecting contaminants at a first position, moving the main body to a second position corresponding to the outermost side when it is identified that the sensor structure detecting the contaminants is located at the outermost side, and obtaining a second entry-forbidden area in response to detecting the contaminants at the second position.

According to an embodiment, the setting a final entry-forbidden area may be performed based on the condition that the sensor structure detecting the contaminants at the first position does not react with the contaminants at the second position.

According to an embodiment, when the sensor structure detecting the contaminants at the first position also reacts with the contaminants at the second position, the second position may be set to the first position, and the operation of obtaining the second entry-forbidden area may be repeated.

According to an embodiment, two or more entry-forbidden areas making up a final entry-forbidden area may increase in proportion to the number of the above repetitions. For example, when the operation of obtaining the second entry-forbidden area is performed twice, the final entry-forbidden area may be provided by merging three entry-forbidden areas, and likewise, when the operation of obtaining the second entry-forbidden area is performed three times, the final entry-forbidden area may be provided by merging four entry-forbidden areas.

According to an embodiment of the disclosure, the mobile robot can prevent the spread of liquid contaminants according to the moving of the robot.

Further, the mobile robot according to an embodiment of the disclosure has a sensor assembly capable of detecting a change in capacitance without exposing an electrode surface of the sensor to the outside of the robot, and a structure coupled with the sensor assembly, so it is possible to protect the sensor from the liquid contaminants.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
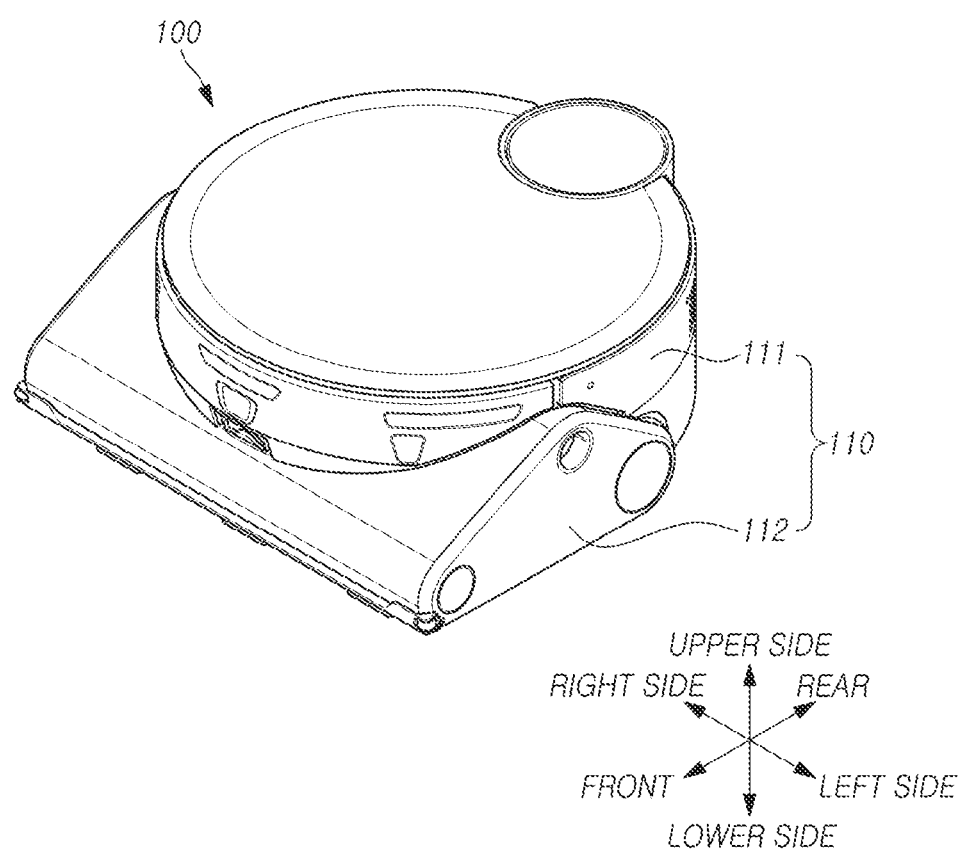
FIG. 1 is a perspective view illustrating a robot according to an embodiment of the disclosure.
Figure 2:
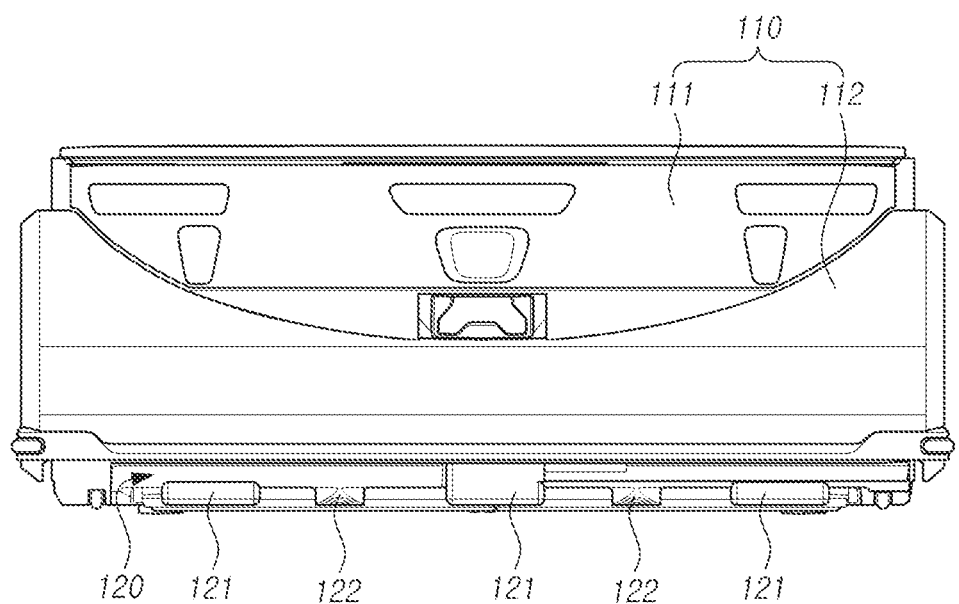
FIG. 2 is a front view illustrating a robot according to an embodiment of the disclosure.
Figure 3:
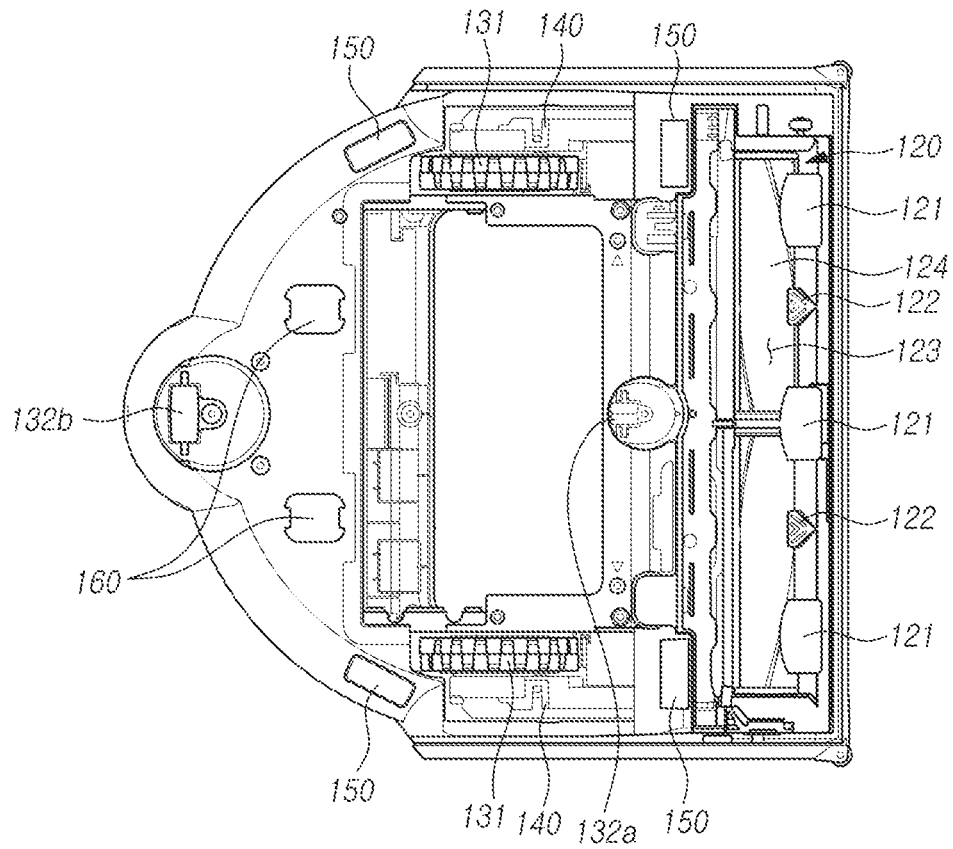
FIG. 3 is a bottom view illustrating a robot according to an embodiment of the disclosure.

FIG. 1 is a perspective view illustrating a robot according to an embodiment of the disclosure, FIG. 2 is a front view illustrating a robot according to an embodiment of the disclosure, and FIG. 3 is a bottom view illustrating a robot according to an embodiment of the disclosure.

Referring not to FIGS. 1 to 3, the robot 100 according to an embodiment of the disclosure may be implemented as a cleaning robot 100. The cleaning robot 100 may autonomously drive in a certain area and perform a function of cleaning a floor within that area. Cleaning the floor may include sucking in dust and foreign substances on the floor or mopping the floor. In the disclosure, the robot 100 may be used interchangeably with the cleaning robot 100, and although FIGS. 1 to 6 and FIGS. 12 to 20 illustrate the cleaning robot 100 as an example, the disclosure is not limited thereto. At least some of the embodiments of the disclosure may be also applied to other mobile robots that do not perform such a cleaning function. More specifically, the cleaning robot 100 illustrated in FIGS. 1 to 6 and FIGS. 12 to 20 may be a certain type of a mobile robot, including a cleaning tool (e.g., a brush and a brush motor for rotating the brush), and it is to be understood that the robot 100 according to various embodiments of the disclosure may be applied not only to a mobile robot equipped with a cleaning tool, but also to other mobile robots not equipped with such a cleaning tool.

According to an embodiment, the robot 100 may include at least one housing defining its external appearance. The housing may integrally form the external appearance of the robot 100, but is not limited thereto, and two or more housings may be combined to form the external appearance of the robot 100. In an embodiment, the two or more housings may include a first housing 111 and a second housing 112 positioned on one side (e.g., a front side) of the first housing 111. A circuit board comprising a processor may be arranged in the first housing 111, and at least one module for implementing various functions of the robot 100 may be arranged in the second housing 112. The at least one module provided in the second housing 112 may include, for example, a cleaning tool assembly and a sensor assembly, but the disclosure is not limited thereto. Meanwhile, throughout the disclosure, the first housing 111 may be referred to as a main housing, and the second housing 112 may be referred to as a module housing, respectively.

A main body 110 of the robot 100 may be provided with a main wheel 131 that is caused to rotate by transmission of a moving force from a driving unit (e.g., a driving motor) 140. The driving unit 140 may be controlled by a processor. The main wheel 131 may be provided at each of both the left and right sides of the main body 110 to support the main body 110. For making independent control of each main wheel 131, different driving motors 140 may be connected to each main wheel 131. Meanwhile, the main body 110 of the robot 100 may be provided with auxiliary wheels 132a and 132b. The auxiliary wheels 132a and 132b may be provided at the lowermost part of the main body 110 to support the main body 110. However, the auxiliary wheels 132a and 132b may be provided at least one side of the rear and/or the front side of the main body 110. In an embodiment, these auxiliary wheels 132a and 132b may not be connected to the driving unit, as opposed to the main wheels 131.

According to an embodiment, the robot 100 may include a cliff sensor 150. The robot 100 may detect a step difference in height on its moving path by using the cliff sensor 150. The cliff sensor 150 may be arranged on at least a portion of the lowermost part of the main body 110. The cliff sensor 150 may include at least one light-emitting element and at least one light-receiving element, which may, for example, irradiate light in infrared or near-infrared wavelength band from the lower part of the main body 110 towards the floor and receive reflected light of the irradiated light, thereby identifying a step difference in height. Meanwhile, the light emitting device applicable to the cliff sensor 150 may typically utilize an infrared or near-infrared wavelength band of light, but the disclosure is not limited thereto.

According to an embodiment, the robot 100 may include a charging terminal 160. As the robot 100 is driven wirelessly, it may be required for a battery (not shown) provided in the main body 110 to be charged in use, and a separate charging station may be provided in a designated place for charging the battery. Further, one or more charging terminals 160 may be positioned on a bottom surface of the main body 110 for connection with the charging station. When the robot 100 completes its traveling or identifies an instruction to return to the charging station, it may travel to return to the charging station, and then stop its moving when the charging terminal 160 in the robot 100 comes into contact with a charging electrode provided in the charging station. Referring to FIG. 3, it is illustrated that the charging terminal is, for example, located in a rear part of the main body 110, but the disclosure is not limited thereto.

According to an embodiment, the robot 100 may include a cleaning tool assembly 120. The cleaning tool assembly 120 may be positioned in a lower part of the main body 110. The cleaning tool assembly 120 may be positioned in a lowermost part of the main body 110, more specifically, in a lowermost part of the second housing 112. The cleaning tool assembly will be described in more detail with further reference to FIGS. 4 to 6 together with FIG. 3.

Hereinafter, description is made to the cleaning tool assembly 120 applicable to the robot 100 according to an embodiment of the disclosure with reference to FIGS. 3 to 6. Meanwhile, an embodiment of the disclosure is not limited to the cleaning robot 100, and may be also applied to other mobile robots. In some embodiments of the disclosure, the cleaning tool assembly 120 may be understood to include a sensor assembly.

According to an embodiment, the cleaning tool assembly 120 may include a sensor assembly and a cleaning tool 124. The sensor assembly may include or have a cover 120a, a sensor structure 170, and a sensor receiving part 121 for positioning the sensor structure 170 between the housing 112 and the cover 120a. According to an embodiment, the cover 120a may be installed at least partially covering the lower part of the main body 110. According to an embodiment, before the cover 120a is installed onto the lower part of the main body 110, one or more tools may be received between the cover 120a and the main body 110, and the cover 120a may be then installed onto the lower part of the main body 110 to accommodate the tools (e.g., a cleaning tool 124, an auxiliary wheel, a main wheel, etc.) in between the main body 110 and the cover 120a. According to an embodiment, the cover 120a may include an opening 123 for exposing at least a part of the received tool. Here, the opening 123 may be formed toward the floor surface, but it is not limited thereto. For the cleaning robot 100, the aforementioned tool may be the cleaning tool 124 (e.g., a brush), and the opening 123 may be provided such that at least a part of the cleaning tool 124 is exposed toward the floor surface.

Figure 4:
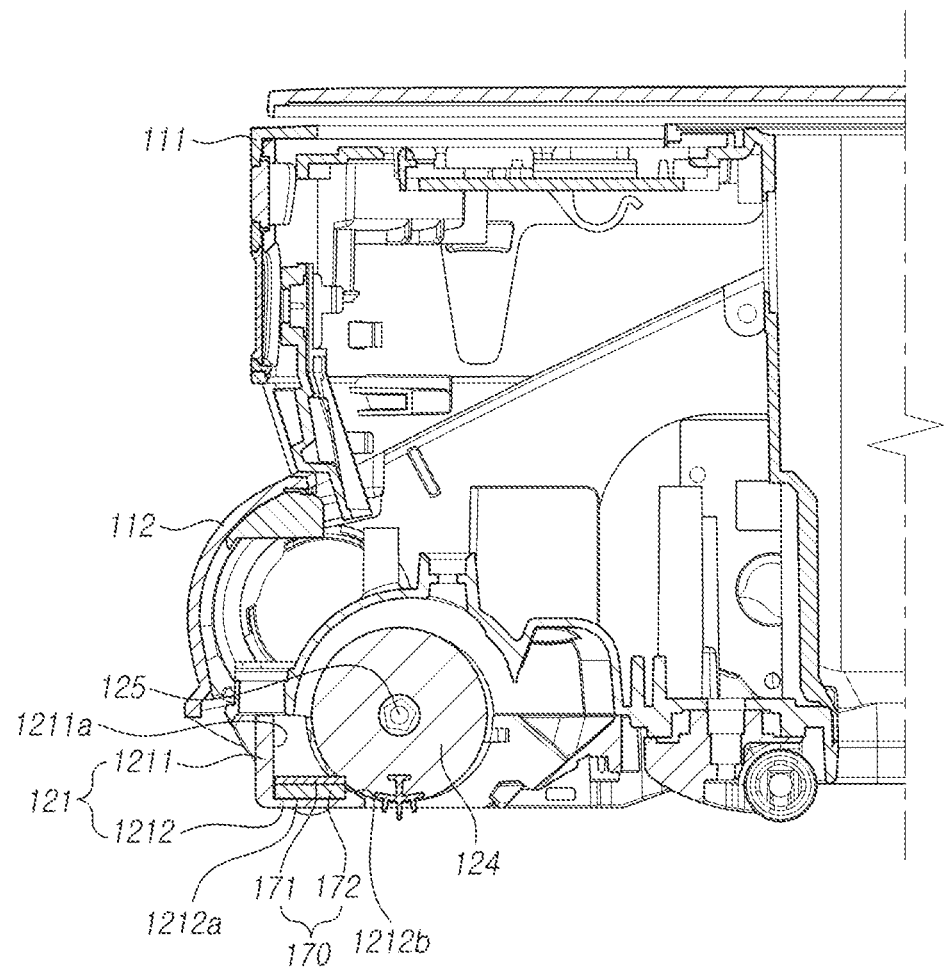
FIG. 4 is a cross-sectional view illustrating a robot for explaining a cleaning tool assembly of a robot according to an embodiment of the disclosure.

FIG. 4 is a cross-sectional view illustrating a robot for explaining a cleaning tool assembly of a robot according to an embodiment of the disclosure.

Figure 5:
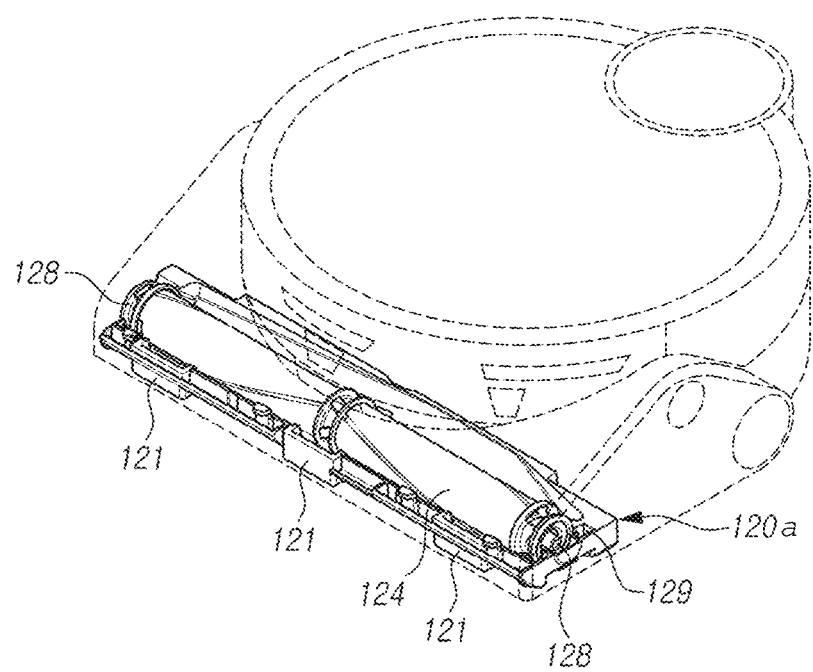
FIG. 5 is a perspective, partially transmitting, view illustrating an example cleaning tool assembly of a robot according to an embodiment of the disclosure.

FIG. 5 is a perspective, partially transmitting, view illustrating an example cleaning tool assembly of a robot according to an embodiment of the disclosure.

Figure 6:
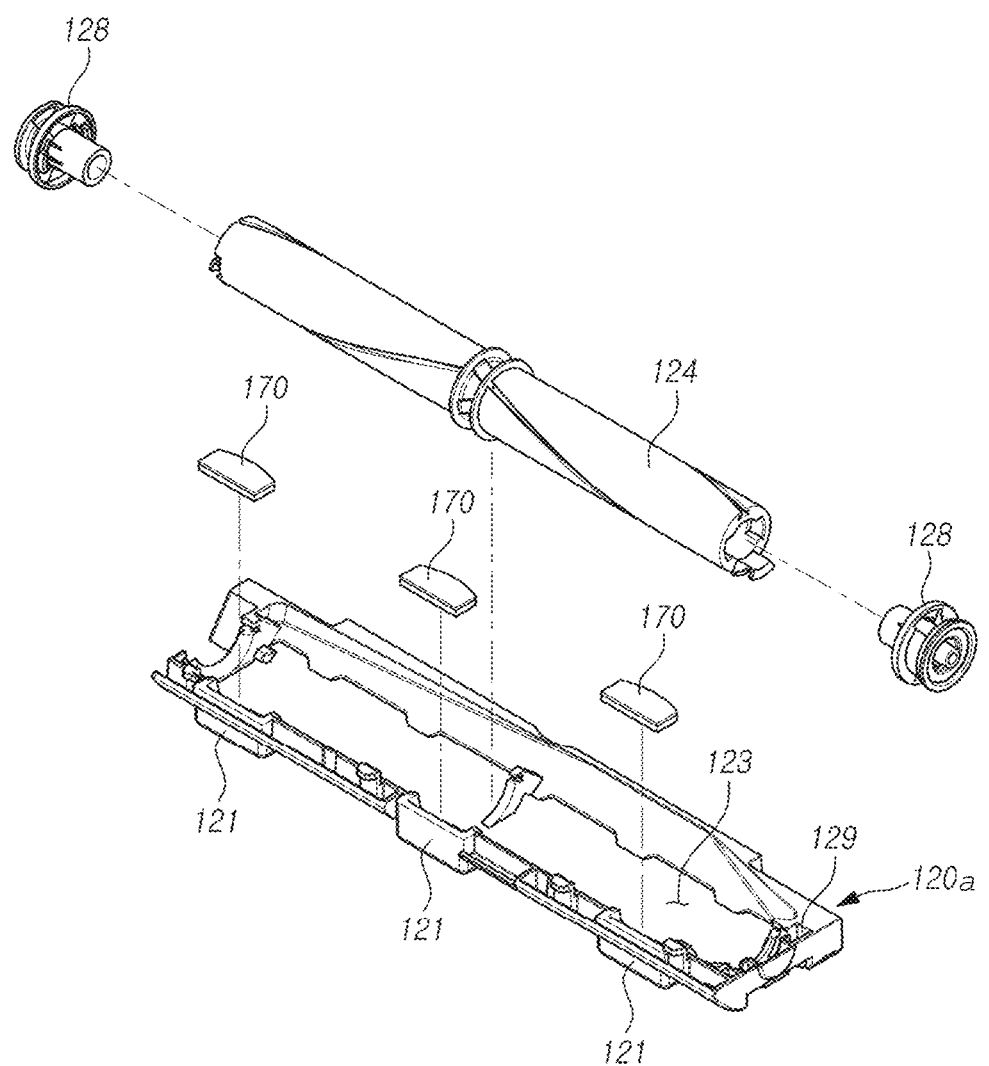
FIG. 6 is an exploded view illustrating an example cleaning tool assembly of a robot according to an embodiment of the disclosure.

FIG. 6 is an exploded view illustrating an example cleaning tool assembly of a robot according to an embodiment of the disclosure.

According to an embodiment, the sensor structure 170 may include a conductive plate 172 and a sensor electrode 171 positioned on the conductive plate 172, and the sensor structure may function, for example, as a capacitive moisture sensor. However, the sensor structure 170 according to an embodiment of the disclosure is not limited to the above-described structure and function, and may be provided as a sensor structure 170 performing various other functions.

According to an embodiment, at least a portion of the sensor receiving part 121 may be bent to form two surfaces with a predetermined angle. The sensor receiving part 121 may include, for example, a first surface (protecting surface) 1211 having a predetermined angle with respect to the floor, and a second surface (supporting surface) 1212 parallel to the floor. Here, the second surface 1212 may be configured in a shape extending from an edge of the first surface 1211a toward the inside of the main body 110. The first surface 1211 may be positioned more in front of the main body 110 than the second surface 1212, and thus, an electronic component (e.g., the sensor structure 170) positioned on the second surface 1212 may be hidden by the first surface 1211 when viewed from the front side. For example, the sensor structure 170 is positioned on the second surface 1212 of the sensor receiving part 121, and the first surface 1211 is positioned more in front of the main body 110 than the second surface 1212, as described above, and thus, the sensor structure 170 arranged on the second surface 1212 may be hidden by the first surface when viewed from the front side.

According to an embodiment, to the rear side of the sensor structure 170 is not formed any other surface, and thus, the sensor structure 170 may be exposed to the outside through the rear side.

According to an embodiment, the sensor structure 170 may be positioned between the housing (e.g., the second housing 112, or an integrally formed single housing) and the cover 120a. Meanwhile, the sensor structure 170 may include a conductive plate 172 and a sensor electrode 171 positioned on the conductive plate 172, as described above. The conductive plate 172 may be positioned on the receiving part 121 formed in the cover 120a, and the sensor electrode 171 may be positioned on the conductive plate 172, coming into surface contact with the conductive plate 172. According to an embodiment, the conductive plate 172 may be configured to have a shape corresponding to the supporting surface 1212, and the supporting surface 1212 may have a recess 1212a and a projection 1212b. For example, if the supporting surface is of a quadrangular shape, the conductive plate 172 may be manufactured in a quadrangular shape to be positioned onto such a quadrangular supporting surface 1212. However, in various embodiments of the disclosure, the shape of the supporting surface is not limited to a quadrangle.

According to an embodiment, an edge of the sensor structure 170 may be at least partially in contact with a protecting surface 1211 of the sensor receiving part 121. For example, at least a part of one edge of the sensor structure 170 may be in contact with the protecting surface 1211 of the sensor receiving part 121, and the other edge may be in contact with the projection 1212b provided on the supporting surface 1212. Meanwhile, the height of the projection 1212b provided on the supporting surface 1212 may be formed so as not to exceed an interface between the conductive plate 172 and the sensor electrode 171, but it is not limited thereto.

According to an embodiment, the robot 100 may include two or more sensor structures 170. In this context, the number of sensor receiving parts 121 for accommodating the sensor structures 170 may be provided in the number corresponding to that of the sensor structures 170. For example, when the sensor assembly includes three sensor structures 170, three sensor receiving parts 121 may be provided, and likewise, when the sensor assembly includes four sensor structures 170, four sensor receiving parts 121 may be provided. According to an embodiment, the sensor assembly may include at least three sensor structures 170. In this case, each sensor structure 170 may be positioned on the left and right sides of the sensor assembly, and at least one sensor structure 170 may be positioned in the center thereof. In other words, at least some of the at least three sensor structures 170 may be arranged in the center (or in a center portion) of the cover making up the sensor assembly. Meanwhile, according to an alternative embodiment, each sensor structure 170 may be positioned on the left and right sides of the sensor assembly, and at least one sensor structure 170 may be positioned in between the left- and right-side sensor structures. For example, when the sensor assembly includes four sensor structures, the two sensor structures may be arranged on the respective edge of the cover, and the remaining two sensor structures may be arranged spaced apart from each other between the two sensor structures arranged on the edges. According to an embodiment, the at least three sensor structures 170 provided in the sensor assembly may be arranged at corresponding positions each to the left and right with respect to a virtual line passing through the center of the cover.

Meanwhile, since the sensor structure 170 is positioned on the sensor receiving part 121, the sensor receiving part 121 may be also arranged similarly to the sensor structure 170. For example, one receiving part or two or more receiving parts may be provided on the left and right ends of the cover and between them, respectively, and at least one receiving part may be provided at any position other than the receiving parts provided on the left and right ends. At least three receiving parts provided in the cover may be arranged at corresponding positions to the left and right on the basis of a virtual line passing through the center of the cover. That is to say, the sensor structure and the sensor receiving part may be arranged to be coupled with each other at the same position on the cover.

For the cleaning tool assembly 120, the cover 120a may include one or more guides 122. The guide 122 may refer to a projection for guiding dust or foreign substances on the floor toward the cleaning tool 124. The guide 122 provided on the cover 120a may be designed to have a triangular shape, but it is not limited thereto. The cover 120a according to an embodiment may include two or more guides 122, in which case the two or more guides 122 may be arranged alternately with the sensor receiving parts 121. For example, when the sensor receiving parts 121 are arranged in the left and right edges and the center of the cover 120a, the guide 122 may be arranged in each space between the sensor receiving parts 121.

For the cleaning tool assembly 120, according to an embodiment, the cleaning tool 124 may be provided in a cylindrical shape, but it is not limited thereto. A rotation hole 125 for connecting to the connector 128 may be formed at both ends of the cleaning tool 124, and the rotation hole 125 and a projection of the connector 128 may be engaged with each other.

A groove 129 for receiving the connector 128 may be formed in at least a part of the cover 120a. In this case, the connector 128 may be configured to have a shape corresponding to the groove 129 of the cover 120a to be at least partially coupled by the groove 129. For example, the connector 128 may be provided in a circular disk shape. The connector 128 is engaged with the cleaning tool 124 through the rotation hole 125, and thus, the cleaning tool 124 may be also coupled as an assembly with the cover 120a as the connector 128 is coupled with the cover 120a.

Further, for the cleaning tool assembly 120, according to an embodiment, the sensor receiving part 121 may be provided more in front of the main body 110 than the opening 123. Further, the sensor receiving part 121 may be positioned side by side with the guide 122 in a straight line. Meanwhile, the sensor receiving part 121 may be formed to protrude from the cover 120a by a predetermined length, thereby also performing a function to guide dust or foreign substances on the floor in the direction of the cleaning tool 124, as is in the guide 122.

Figure 7:
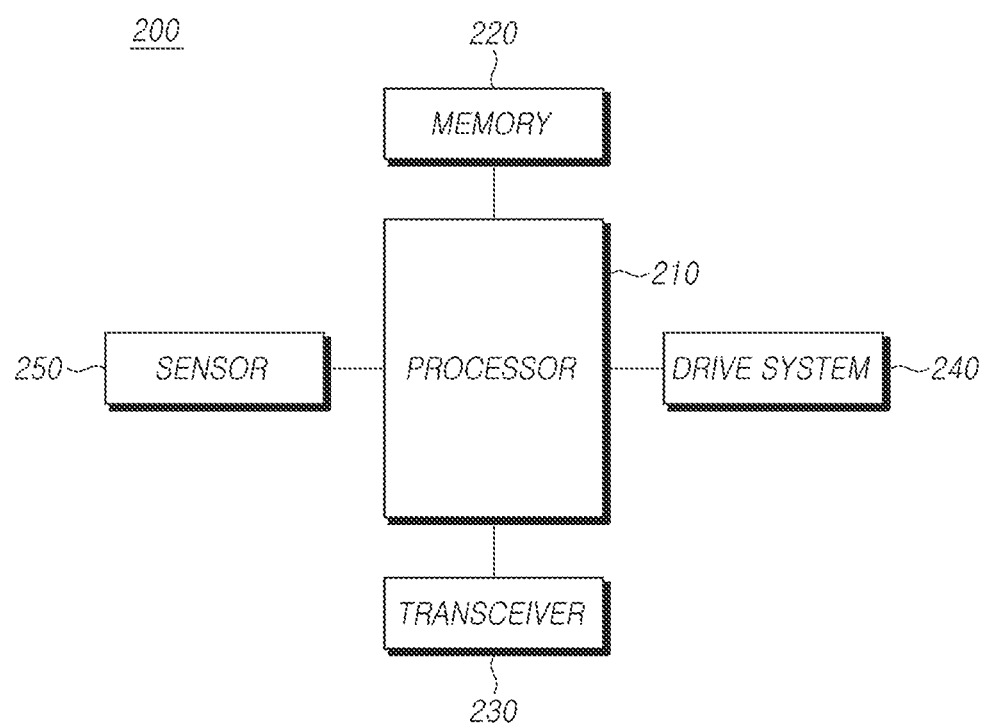
FIG. 7 is a schematic block diagram illustrating a robot according to an embodiment of the disclosure.

FIG. 7 is a schematic block diagram illustrating a robot according to an embodiment of the disclosure.

The robot 200 according to an embodiment of the disclosure may be a mobile robot 200 having one or more wheels supporting a main body. The mobile robot 200 may include, for example, a cleaning robot, an assistant robot, and a pet care robot, but the disclosure is not limited thereto. The mobile robot 200 may include one or more tools for performing a unique function depending on its type. For example, the cleaning robot may include a cleaning tool for removing dust or foreign substances from a floor surface. For example, the assistant robot may include a microphone and/or a speaker for voice recognition and output. For example, the pet care robot may include a feeding means for storing and discharging snacks or feed for a pet.

Referring to FIG. 7, the robot 200 according to an embodiment of the disclosure may include a processor 210, a transceiver 230, and a memory 220. Here, the processor 210 may be electrically or functionally connected to the transceiver 230 and the memory 220. The processor 210 may generate or transmit a control instruction to control the components of the robot 200.

According to an embodiment, the processor 210 may include storage and processing circuitry to support the operation of the robot 200. The storage and processing circuitry may include storage such as a non-volatile memory (e.g., flash memory, solid state drive (SSD) or other electrically programmable read only memory (ROM) configured to form a non-volatile memory), a volatile memory (e.g., static or dynamic random access memory (RAM)), and the like. A processing circuitry within the processor 210 may be used to control the operation of the robot 200. The processing circuitry may be based on or include one or more microprocessor(s), microcontroller(s), digital signal processor(s), baseband processor(s), power management section (s), audio chip(s), application specific integrated circuit(s), and so on.

According to an embodiment, the memory 220 may include a memory area for at least one processor 210 to store various parameters used in protocol, configuration and control of the robot 200 and its other functions, including operations corresponding to or comprising any of the methods and/or procedures exemplarily described in the disclosure. Further, the memory 220 may include a non-volatile memory, a volatile memory, or a combination thereof. Further, the memory 220 may interface with a memory slot that allows insertion and removal of one or more formats of removable memory cards (e.g., secure digital (SD) card, memory stick, compact flash, or the like).

According to an embodiment, the transceiver 230 includes one or more antennas. The antenna may serve to transmit a signal processed by the transceiver 230 under the control of the processor 210 to the outside, or receive a radio signal from the outside to transmit the signal to the transceiver 230. Each antenna may be also referred to as an antenna port. Each antenna may correspond to one physical antenna or may be configured by a combination of two or more physical antenna elements. The transceiver 230 may provide a wireless communication function using a certain radio frequency, and may include a network interface or a modem for connecting the robot 200 according to an embodiment of the disclosure to a network (e.g., Internet, local area network (LAN), wide area network (WAN), telecommunication network, cellular network, satellite network, plain old telephone service (POTS), fifth generation (5G) network, or the like). The transceiver 230 may be responsible for transmitting/receiving data, for example, transmitting/receiving an RF signal or a called electronic signal. For example, the transceiver 230 may include a power amplification module (PAM), a frequency filter, a low noise amplifier (LNA) or the like.

According to an embodiment, the robot 200 may further include a sensor 250. The sensor 250 may include a lidar sensor, a cliff sensor, a bumper sensor, an image sensor, a gyro sensor, a pressure sensor, a moisture sensor, and the like. The lidar sensor is one of Time of Flight (ToF)-based range sensors, and may generate a moving map for a space in which the robot 200 is to drive. The cliff sensor may serve to measure the distance between the floor and the main body using infrared light, and if the measured distance increases, it may be identified as having a step difference. The image sensor may be arranged on one side of the robot 200 to capture an image of an object located around the robot 200. The gyro sensor may serve to measure gradient of the main body. The pressure sensor may be connected to one component of the robot 200 to measure pressure due to contact with an outside object. The moisture sensor may detect liquid on the floor through a change in capacitance or a change in resistance.

Meanwhile, according to an embodiment of the disclosure, the sensor structure 170 shown in FIGS. 4 and 6 may function as a moisture sensor. Thus, throughout the disclosure, the sensor structure may be referred to as a moisture sensor.

According to an embodiment, the robot 200 may further include a driving unit 240. The robot 200 may include one or more driving units 240, and the driving unit 240 may be connected to a wheel module and a brush module. One or more driving units 240 may be provided for each of the wheel module and the brush module. The driving unit 240 may include a motor, wherein the motor connected to the wheel module may be referred to as a wheel motor, and the motor connected to the brush module may be referred to as a brush motor. The driving unit 240 may control the wheel module to drive the robot 200. The driving unit 240 may control the brush module to allow the robot 200 according to an embodiment of the disclosure to remove dust or foreign substances from the floor.

In the meantime, the processor 210 according to an embodiment of the disclosure may use at least one program to implement the control method of the robot 200 to be described later, so as to perform at least one operation of each of the control method.

According to an embodiment, the processor 210 may receive a detection signal (sensing signal) for contaminants located in front of the robot from the moisture sensor to detect the contaminants in the front.

According to an embodiment, the processor 210 may identify the moisture sensor that has detected contaminants, and set an entry-forbidden area based on at least one of the position and the number of the identified moisture sensor(s). The robot 200 may be equipped with one or two or more moisture sensors. At this time, in order to identify the position of each moisture sensor, each of the moisture sensors may have its own unique identification information. The robot 200 may independently classify a plurality of moisture sensors based on the identification information, and identify the moisture sensors that have detected contaminants. Since the robot 200 according to an embodiment of the disclosure sets the entry-forbidden area based on the position and/or the number of the moisture sensors that have detected contaminants, the aforementioned identification information of the moisture sensor is to be understood to be associated with generation of the entry-forbidden area.

According to an embodiment, once the entry-forbidden area is set, the processor 210 may control the driving unit 240 to move the robot in a direction (e.g., backwards) opposite to the entry-forbidden area, thereby allowing the robot 200 to move away from the contaminants. The robot 200 typically travels forward, and thus, the entry-forbidden area may be generally set in front of the robot 200. In other words, when the entry-forbidden area is set, the direction opposite to the entry-forbidden area may be a rear of the robot, and the processor 210 may drive the robot 200 backwards without rotating the main body. Here, the backward moving of the robot 200 by the processor 210 may be performed in response to setting of the entry-forbidden area. In more detail, when a preset entry-forbidden area exists, the robot 200 will travel avoiding the preset entry-forbidden area, while when a new entry-forbidden area is set, the robot 200 may travel backwards evading the corresponding area.

Meanwhile, according to an embodiment of the disclosure, such a backward moving may be performed irrespective of the entry-forbidden area. More specifically, the processor 210 of the robot 200 according to an embodiment may control the driving unit 240 to temporarily cease moving of the robot 200 before the entry-forbidden area is set, that is, in response to detection of the contaminants by the moisture sensor and then, travel backwards from the position where the contaminants have been detected. In other words, the operation forming the basis of the backward moving is not limited to the operation of setting the entry-forbidden area, and it may further include the operation of detecting contaminants by the moisture sensor. A distance of backward moving controlled by the processor 210 will be described later with reference to FIG. 14.

In the meantime, when contaminants are detected by the moisture sensor, the contaminants and the robot 200 may at least partially come into contact with each other and some of the contaminants may remain on the contacted portion of the robot 200, so that the contaminants can spread here and there within the space as the robot 200 travels. In order to prevent such spread, the processor 210 of the robot 200 according to an embodiment may identify again the sensing signal of the moisture sensor that has detected the contaminants, while moving backwards or after moving backwards. When the sensing signal is still received by the moisture sensor despite moving backwards by a certain distance, the processor 210 may determine that the contaminants still remain and then cease moving. Through this operation, it is possible to prevent the spread of contaminants by the robot 200 itself in advance. If, as a result of moving backwards by a certain distance, no more sensing signal is received by the moisture sensor, the processor 210 may determine that the robot has travelled up to an area where no contaminants exist or remain, and perform a subsequent operation.

According to an embodiment, after the entry-forbidden area has been set, the processor 210 may control the driving unit 240 not to pass the entry-forbidden area. Meanwhile, according to an embodiment of the disclosure, such an evading moving of the robot for the entry-forbidden area may be performed after a final entry-forbidden area is set. A detailed description of the setting of the final entry-forbidden area will be described later with reference to FIGS. 15, 19, and 20.

Figure 8:
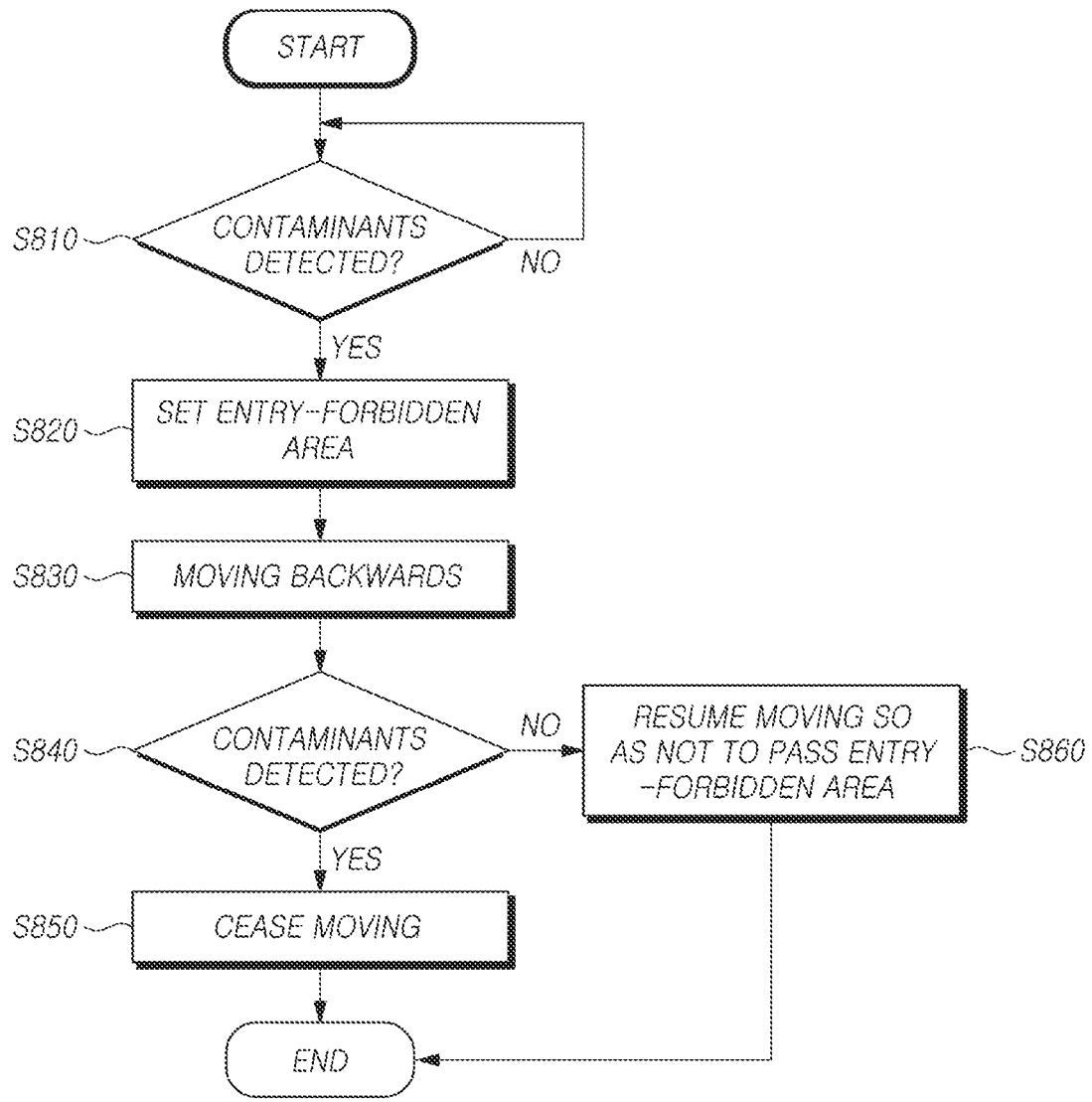
FIG. 8 is a flowchart illustrating an example method for controlling a robot according to an embodiment of the disclosure.

FIG. 8 is a flowchart illustrating an example of a method for controlling a robot according to an embodiment of the disclosure.

According to an embodiment, the robot may detect contaminants in front of it by means of the moisture sensor at operation S810.

According to an embodiment, the robot may identify the moisture sensor that has detected the contaminant, and set an entry-forbidden area based on at least one of the position and the number of the identified moisture sensor(s) at operation S820.

According to an embodiment, when the entry-forbidden area is set, the robot may travel in a direction opposite to the entry-forbidden area (e.g., rearward) at operation S830.

According to an embodiment, the robot may identify whether the contaminants remain or not, by identifying again the sensing signal of the moisture sensor that has detected the contaminants, while traveling backwards or after traveling backwards at operation S840.

According to an embodiment, when the contaminants is still detected even though the robot travelled backwards or while it is moving, the robot may cease moving at operation S850. In contrast, when no contaminants are detected by the robot moving backwards or during its moving, the robot may resume the moving, and in this case, the robot may travel so as not to pass the preset entry-forbidden area at operation S860.

Figure 9:
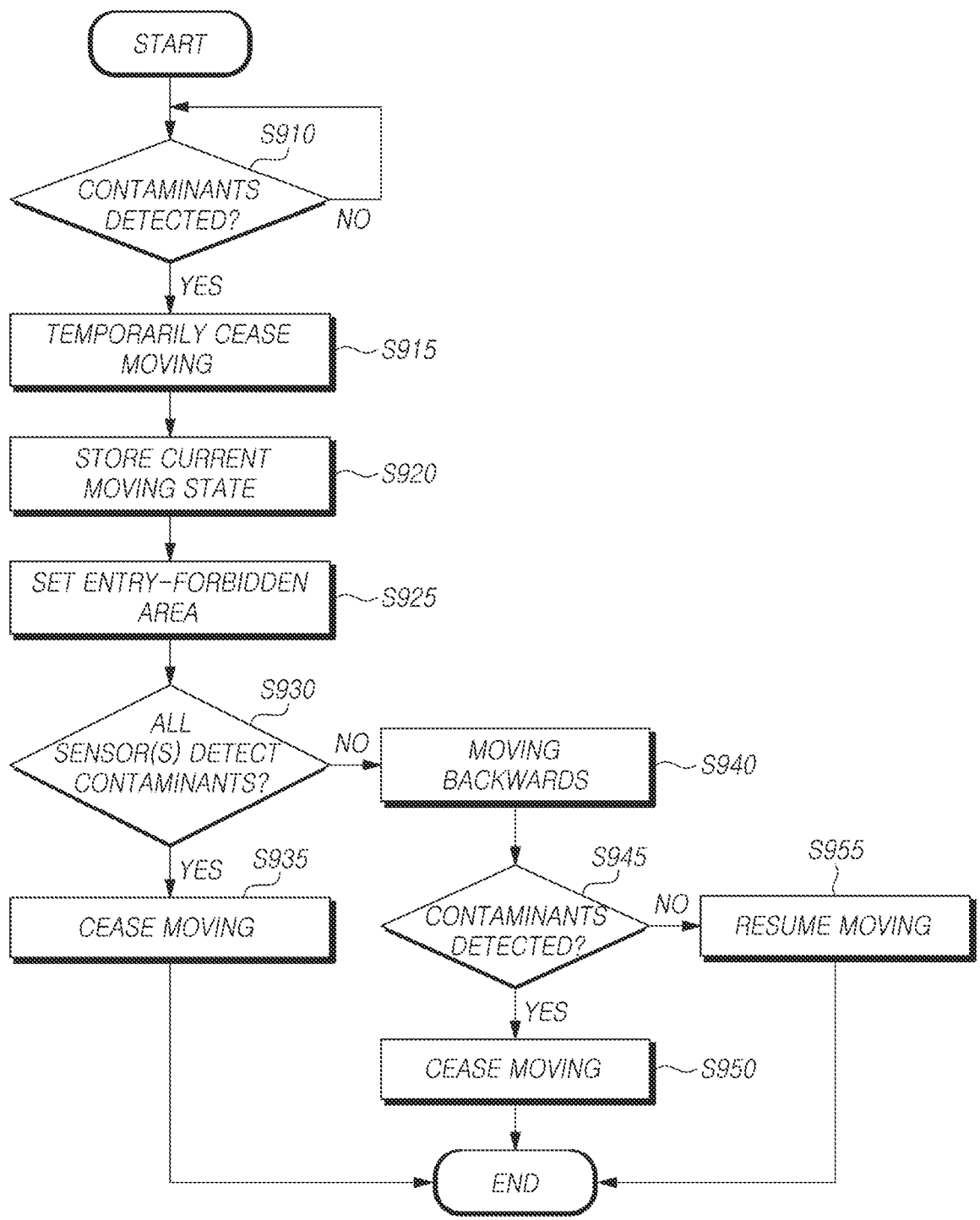
FIG. 9 is a flowchart illustrating an example method for controlling a robot according to an embodiment of the disclosure.

FIG. 9 is a flowchart illustrating an example of another control method of a robot according to an embodiment of the disclosure.

Referring to FIG. 9, it is to be understood that S910 and S925 may correspond to S810 and S820, respectively, and S945, S950 and S955 may correspond to S840, S850, and S860, respectively. Thus, description will be made focusing on a difference in operation between FIGS. 8 and 9.

According to an embodiment, when contaminants are detected by the moisture sensor in front of the robot, the robot may temporarily cease moving before setting an entry-forbidden area at operation S915.

Further, according to an embodiment, the robot may store the current moving state, in a state that the moving is stopped or in response to the moving being stopped at operation S920.

According to an embodiment, when all moisture sensors of the robot have detected contaminants at operation S930, the robot may cease moving at operation S935. In contrast, when some of the moisture sensors of the robot have detected contaminants, the robot may travel in a direction opposite to the entry-forbidden area (e.g., backwards) at operation S940.

Figure 10:
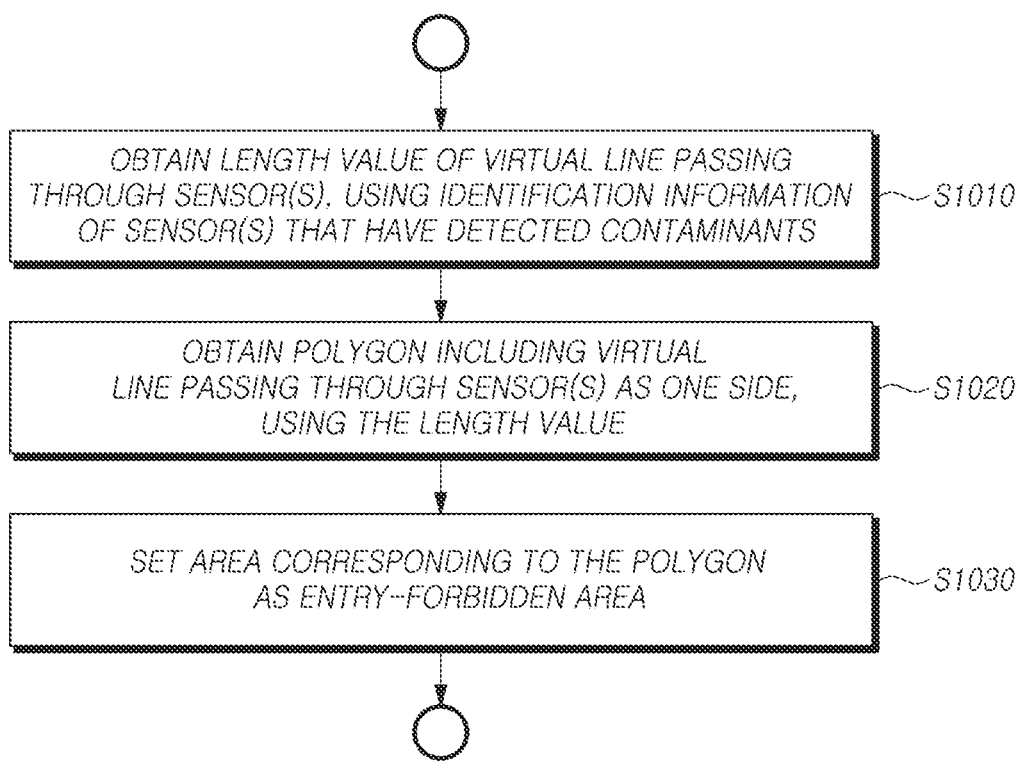
FIG. 10 is a flowchart illustrating an example of S820 of FIG. 8 or S925 of FIG. 9 according to an embodiment of the disclosure.

FIG. 10 is a flowchart illustrating an example of S820 of FIG. 8 or S925 of FIG. 9 according to an embodiment of the disclosure.

According to an embodiment, the robot may obtain a length value of a virtual line that traverses the moisture sensors, using identification information of the moisture sensors that have detected the contaminants at operation S1010.

According to an embodiment, the robot may obtain a polygon (i.e., a polygonal area) having as its one side the virtual line passing through the moisture sensors, by using the length value of the virtual line at operation S1020.

According to an embodiment, the robot may set an area corresponding to the obtained polygon (i.e., the polygonal area) as the entry-forbidden area at operation S1030.

The example of FIG. 10 may be apparently understood with further reference to FIGS. 11 to 14.

FIGS. 11, 12, 13, and 14 are references illustrating an embodiment of FIG. 10 according to various embodiments of the disclosure.

Figure 11:
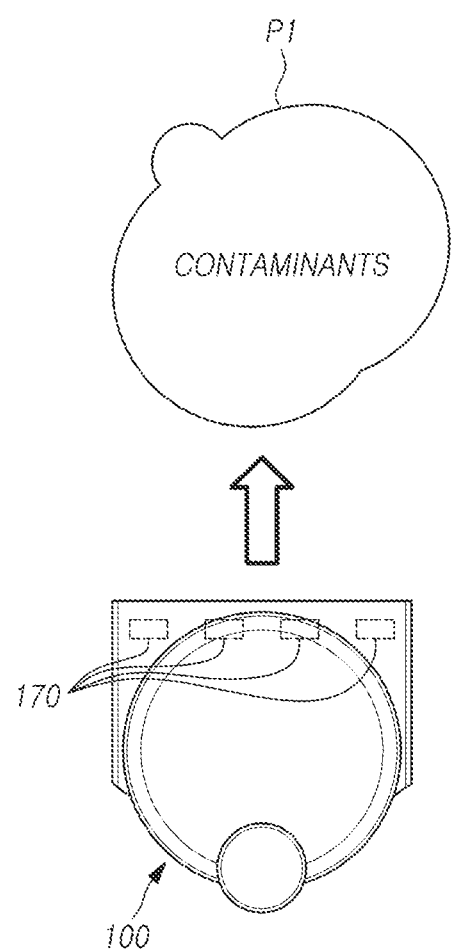
FIGS. 11, 12, 13, and 14 are references illustrating an embodiment of FIG. 10 according to various embodiments of the disclosure.

Referring to FIG. 11, the robot 100 may move toward contaminants P1. Here, although the robot 100 is illustrated as having four moisture sensors 170 in its front side, the disclosure is not limited thereto.

Figure 12:
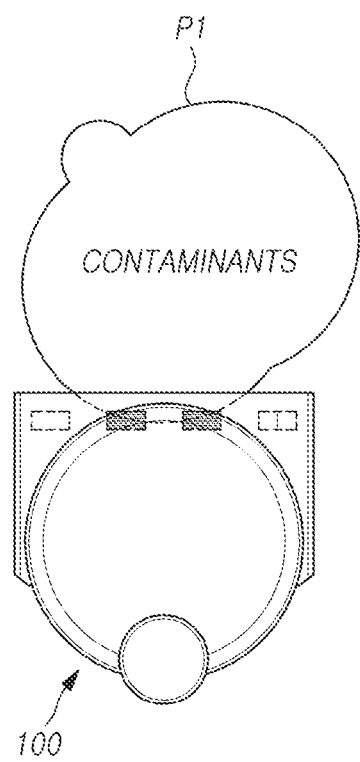

Referring to FIG. 12, the robot 100 may identify the contaminants P1 through the moisture sensor 170 while moving toward the contaminants P1. That is to say, the moisture sensor 170 may detect the contaminants P1 to generate a sensing signal. The generated sensing signal may be transmitted to the processor of the robot 100, and the robot 100 may set an entry-forbidden area based on the sensing signal.

Figure 13:
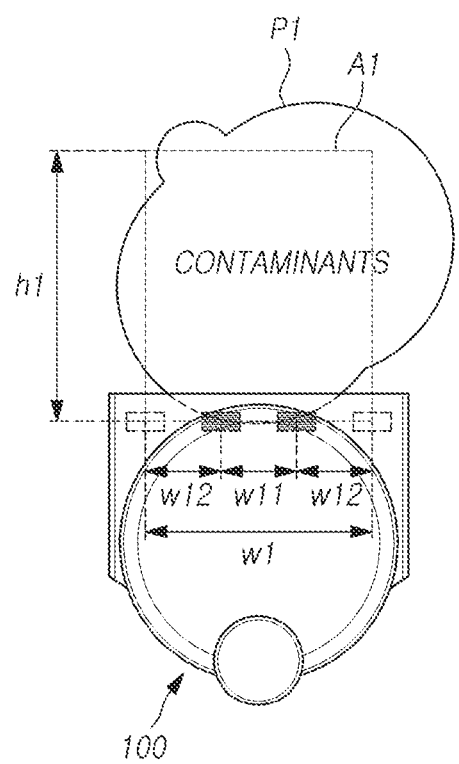

FIG. 13 is a reference illustrating an example of a method of determining a position and/or an area of the entry-forbidden area A1 according to an embodiment of the disclosure.

Referring to FIG. 13, the entry-forbidden area A1 is illustrated as being provided in a quadrangle, but the disclosure is not limited thereto. The robot 100 may obtain a length value w1 of a virtual line based on the position and the number of the moisture sensors 170 that have detected the contaminants P1 to generate the sensing signal, and may determine the shape and area of the polygon (polygonal area) corresponding to the entry-forbidden area A1, based on the length value of the virtual line.

According to an embodiment, the length value w1 of the virtual line may be formulated of a combination of two types of length values. The two types of length values may include a distance value w11 between the moisture sensors 170 that have detected the contaminants P1, and a distance value w12 between one moisture sensor 170 that has detected the contaminants P1 and another moisture sensor 170 that is located adjacent thereto and has not detected the contaminants P1. Here, the virtual line may be a first side of the entry-forbidden area A1.

According to an embodiment, once the length value w1 of the virtual line is determined, the robot 100 may determine the length value h1 of a second side of the entry-forbidden area A1 based on the length value w1 of the virtual line. The entry-forbidden area A1 may be formed in the shape of, for example, a rectangle or a square, and in the case of a rectangle, the length w1 of the first side and the length h1 of the second side may be preset to be associated with each other. In other words, when the length value w1 of the first side is obtained, the length value h1 of the second side equal to or associated with the length value w1 of the first side may be obtained. As such, when the length value w1 of the first side and the length value h1 of the second side are obtained, the robot 100 may generate a rectangular shape of entry-forbidden area A1 based on the first and second sides.

Figure 14:
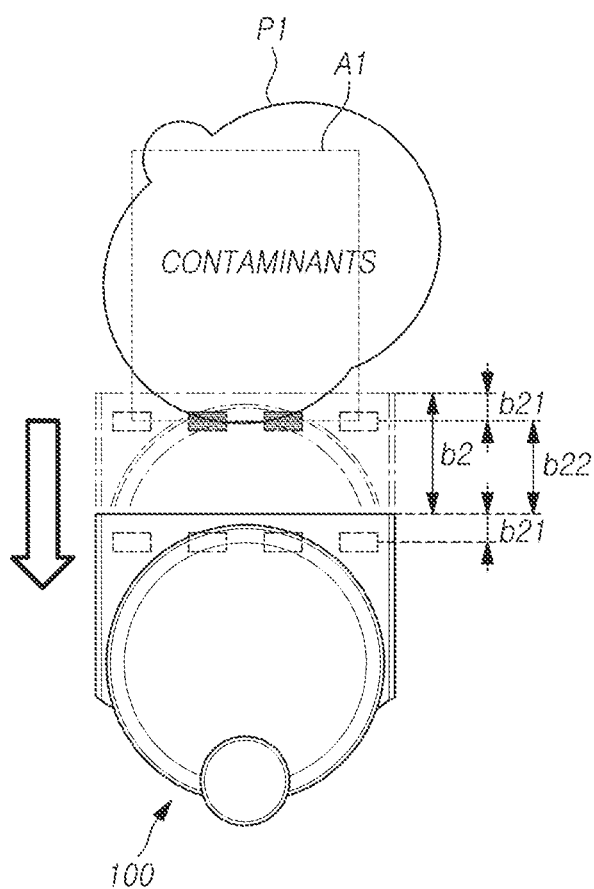

FIG. 14 is a reference illustrating an example of a method for determining a distance by which the robot 100 travels backwards from the entry-forbidden area A1 according to an embodiment of the disclosure.

Referring to FIG. 14, the robot 100 may determine a distance b2 to travel backward based on a distance between the moisture sensors 170 and the front edge of the main body. The moisture sensors 170 may be arranged in a line parallel to the front edge of the main body. For reference, the moisture sensors 170 may be arranged in the sensor receiving part provided on the cover installed in the lower part of the main body, as shown in FIGS. 3, 4 and 6, and the sensor receiving part may be formed parallel to the front edge of the main body.

According to an embodiment, the backward moving distance b2 of the robot 100 may be formulated with a combination of the distance b21 between an alignment line of the moisture sensors 170 and the front edge of the main body, and a preset marginal distance b22. The distance b21 between the alignment line of the moisture sensors 170 and the front edge of the main body may be set differently based on the design of the robot 100, and the value may be stored in advance in the memory. Further, the preset marginal distance b22 may be also stored in advance in the memory.

If the robot only travels by the distance b21 between the alignment line of the moisture sensors 170 and the front edge of the main body, in some cases, the robot 100 may not completely escape from the contaminants P1, and thus, the robot 100 according to an embodiment of the disclosure provides a marginal distance b22 to prevent occurrence of such a circumstance. With this marginal distance, the robot 100 can completely escape from the contaminants P1 and subsequently perform any additional operation.

In the meantime, as described above in S830 of FIG. 8 and S940 of FIG. 9, the robot 100 according to an embodiment of the disclosure may identify a state of the moisture sensors 170 while moving backwards or after the backward moving. As opposed to solid contaminants, liquid contaminants (P1) may spread in contact with other objects, so it is necessary for the robot 100 to identify whether the liquid contaminants (P1) have been removed from the robot 100 before performing further operations. Otherwise, the liquid contaminants (P1) may further spread here and there. The robot 100 according to an embodiment may identify whether the moisture sensor 170 that has previously detected the contaminants P1 still generates a sensing signal while moving backwards or after moving backwards. At this time, when it is identified that the moisture sensor 170 that has previously detected the contaminants P1 still generates the sensing signal, it may be identified that the liquid contaminants P1 still remains in the main body of the robot 100 or at least a part of the main body, and then, the robot 100 may stop without performing moving further. On the other hand, when no sensing signal is identified from the moisture sensor 170 that has previously detected the contaminants P1, it is identified that the liquid contaminants P1 has been fully removed from the main body, and the robot 100 may then perform further moving.

Figure 15:
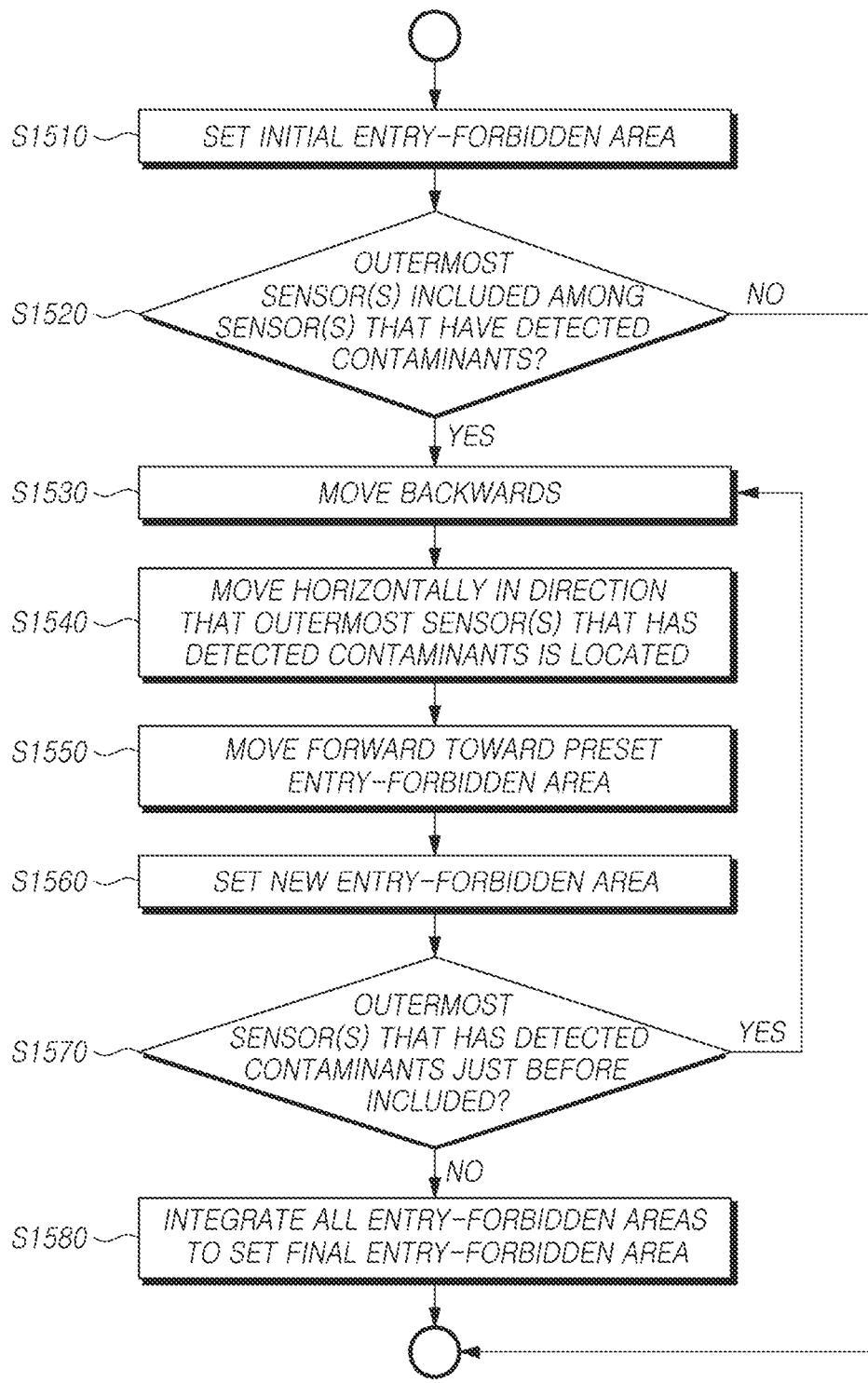
FIG. 15 is a flowchart illustrating an example of S820 of FIG. 8 or S925 of FIG. 9 according to an embodiment of the disclosure.

FIG. 15 is a flowchart illustrating an example of an embodiment of S820 of FIG. 8 or S925 of FIG. 9 according to an embodiment of the disclosure.

According to an embodiment, when an outermost sensor is included among the sensors that detected the contaminants, the robot may not be able to know how much more contaminants are present in the direction of the outermost sensor. Therefore, in some cases where only a very small amount of the entire contaminants has been detected, it may not be possible for a robot to set an entry-forbidden area specifying the entire range of contaminants, but the robot according to an embodiment of the disclosure can set such an entry-forbidden area for the entire range of contaminants.

According to an embodiment, when contaminants are detected by the moisture sensors while moving, the robot may set an initial entry-forbidden area based on at least one of the position and the number of moisture sensors that have detected the contaminants at operation S1510.

The initial entry-forbidden area may be referred to as a first entry-forbidden area.

According to an embodiment, the robot may identify whether an outermost sensor is included among the moisture sensors that have detected contaminants at operation S1520.

According to an embodiment, when the outermost sensor is included among the moisture sensors that detect the contaminants, the robot may travel in the opposite direction (e.g., backwards) to the first entry-forbidden area at operation S1530.

According to an embodiment, the robot may travel in the direction in which the outermost sensor detecting the contaminants is located at operation S1540. Here, the robot may travel horizontally.

In the case of the outermost sensor, there is no other moisture sensor in its outward direction, so the robot is not able to identify the position and/or range of contaminants that exist more out of the outermost sensor. As such, if the outermost sensor is included among the moisture sensors detecting the contaminants, the robot may again identify the position and/or range of the contaminants by moving the robot in the direction of the outermost sensor.

According to an embodiment, the robot may travel forward again toward the preset first entry-forbidden area at operation S1550.

According to an embodiment, the robot may set a second entry-forbidden area based on at least one of the position and the number of moisture sensors that have newly detected the contaminants by moving forward again at operation S1560. The second entry-forbidden area may be set based on the position and/or range different from the first entry-forbidden area.

According to an embodiment, the robot may identify whether the outermost moisture sensor that detected the contaminants just before is included among the moisture sensors that have newly detected the contaminants at operation S1570.

According to an embodiment, when the outermost moisture sensor that detected the contaminants right before is included among the moisture sensors that have newly detected the contaminants, the robot may repeat the above-described operations of S1530 to S1570 to set third to N-th entry-forbidden areas, wherein N is a natural number, indicating the order in case where the outermost moisture sensor that has detected the contaminants right before is not included as one of the moisture sensors that have newly detected the contaminants.

According to an embodiment, the robot may integrate the first to N-th entry-forbidden areas to set a final entry-forbidden area at operation S1580. In other words, the robot may be controlled to move in the direction of the outermost moisture sensor until the outermost moisture sensor that has detected the contaminants right before is not included as any one of the moisture sensors that detected the contaminants, thereby obtaining a plurality of entry-forbidden areas, and then merging the plurality of entry-forbidden areas to obtain the final entry-forbidden area. Thereafter, the robot may travel avoiding the obtained final entry-forbidden area.

FIGS. 16, 17, 18, 19, and 20 are references illustrating an example of FIG. 15 according to various embodiments of the disclosure.

Figure 16:
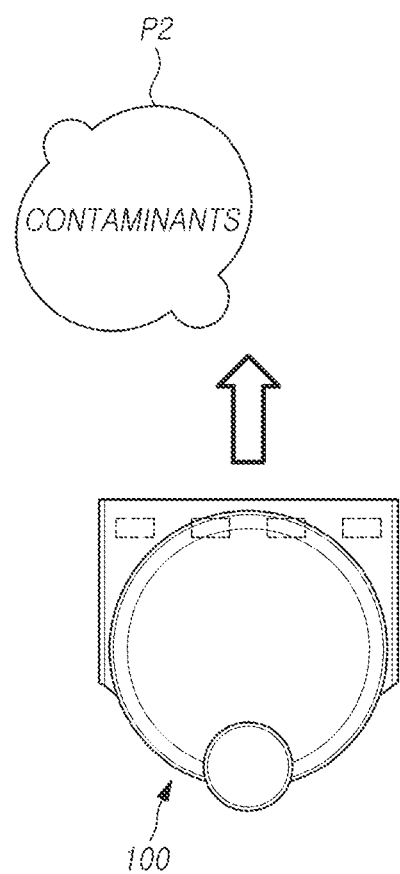
FIGS. 16, 17, 18, 19, and 20 are references for explaining an embodiment of FIG. 15 according to various embodiments of the disclosure.
Figure 17:
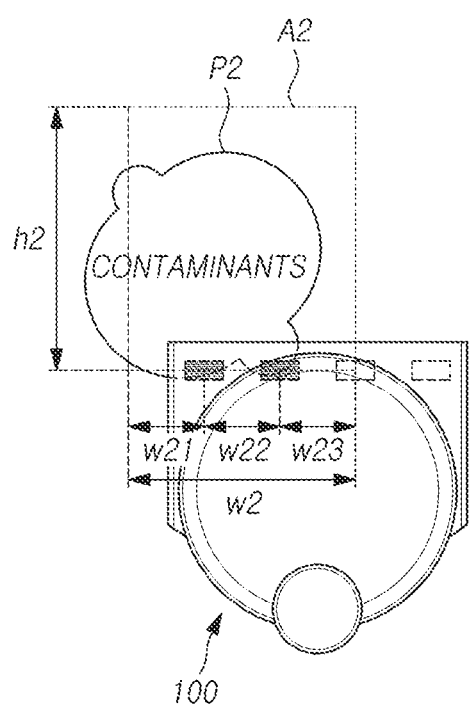

Referring to FIGS. 16 and 17, as a result of the robot 100 traveling toward the contaminants P2, at least some of the moisture sensors 170 may detect the contaminants P2. Although it is illustrated that the robot 100 of FIG. 17 has four moisture sensors 170, various embodiments of the disclosure are not limited thereto. Referring to FIG. 17, the left two sensors including the outermost sensor among the four moisture sensors 170 of the robot 100 may detect the contaminants P2.

According to an embodiment, at least one processor provided in the robot 100 may set the entry-forbidden area A2 based on the position and/or the number of moisture sensors detecting the contaminants P2. More specifically, once a length w2 of one side of the entry-forbidden area A2 is determined, the entry-forbidden area A2 corresponding to the determined length w2 of one side may be then set. When the length w2 of one side is determined, a length h2 of another side equal to or related to the determined length w2 of the side may be determined.

According to an embodiment, the length value w2 of a virtual line may include a combination of three types of length values. The three types of length values may include a distance value w22 between two moisture sensors 170 detecting the contaminants P2, a distance value w23 between the moisture sensor 170 detecting the contaminants P2 and its neighboring moisture sensor 170 not detecting the contaminants P2, and a marginal distance value w21 spaced apart by a predetermined distance from the outermost sensor. In other words, the virtual line according to an example of FIG. 17 may further include a marginal distance value w21 provided spaced apart by a predetermined distance from the outermost sensor, compared to the virtual line according to an example of FIG. 13. Here, the marginal distance value w21 may refer to a length value of the virtual line extending in the direction in which the outermost sensor is located. As such, the marginal distance value w21 is further included because the outermost sensor is the moisture sensor 170 arranged on the outermost side of the main body and there is no more other moisture sensor adjacent to the outermost side. Here, the marginal distance value w21 may be, for example, manually preset by the user, but the disclosure is not limited thereto.

The rest of the operation of setting the entry-forbidden area based on the virtual line determined as described above and the length value of the virtual line may be substantially the same as that described with reference to FIG. 13, so its duplicate description will be omitted.

Figure 18:
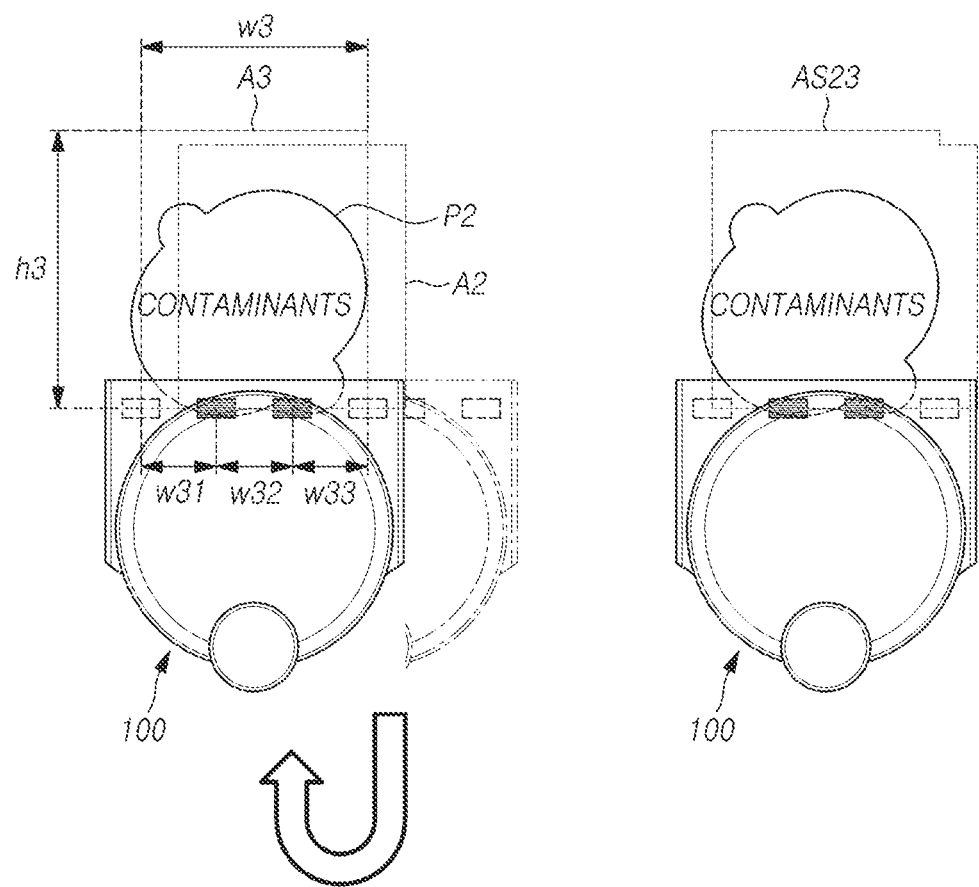

Referring then to FIG. 18, description is made to an additional operation for setting an entry-forbidden area AS23 for the entire contaminants P2. When it is identified that the outermost moisture sensor 170 has detected the contaminants P2, the robot 100 may move in the direction in which the outermost moisture sensor 170 is located. At this time, traveling of the robot 100 may be performed in the order of, for example, backward traveling-parallel traveling-forward traveling, and in the case of backward traveling, it may travel backwards by a predetermined distance in the manner described above in relation to FIG. 14. Further, according to an embodiment, as described above in S830 of FIG. 8 and S940 of FIG. 9, the robot 100 may identify a state of the moisture sensor 170 while moving backwards or after moving backwards.

Referring back to FIG. 18, the robot 100 traveling in the direction in which the outermost moisture sensor 170 is located may again detect the contaminants P2, and the robot 100 may set a new entry-forbidden area A3 based on the number and/or the position of the moisture sensors 170 that it have newly detected. The robot 100 according to an embodiment may repeat its moving and setting of the entry-forbidden area A3 until the outermost moisture sensor 170 that first detected the contaminants P2 does not detect any more contaminants P2. Then, when it is identified that the outermost moisture sensor 170 does not detect the contaminants P2 any more, the robot 100 may merge the accumulated entry-forbidden areas to set the final entry-forbidden area AS23.

Figure 19:
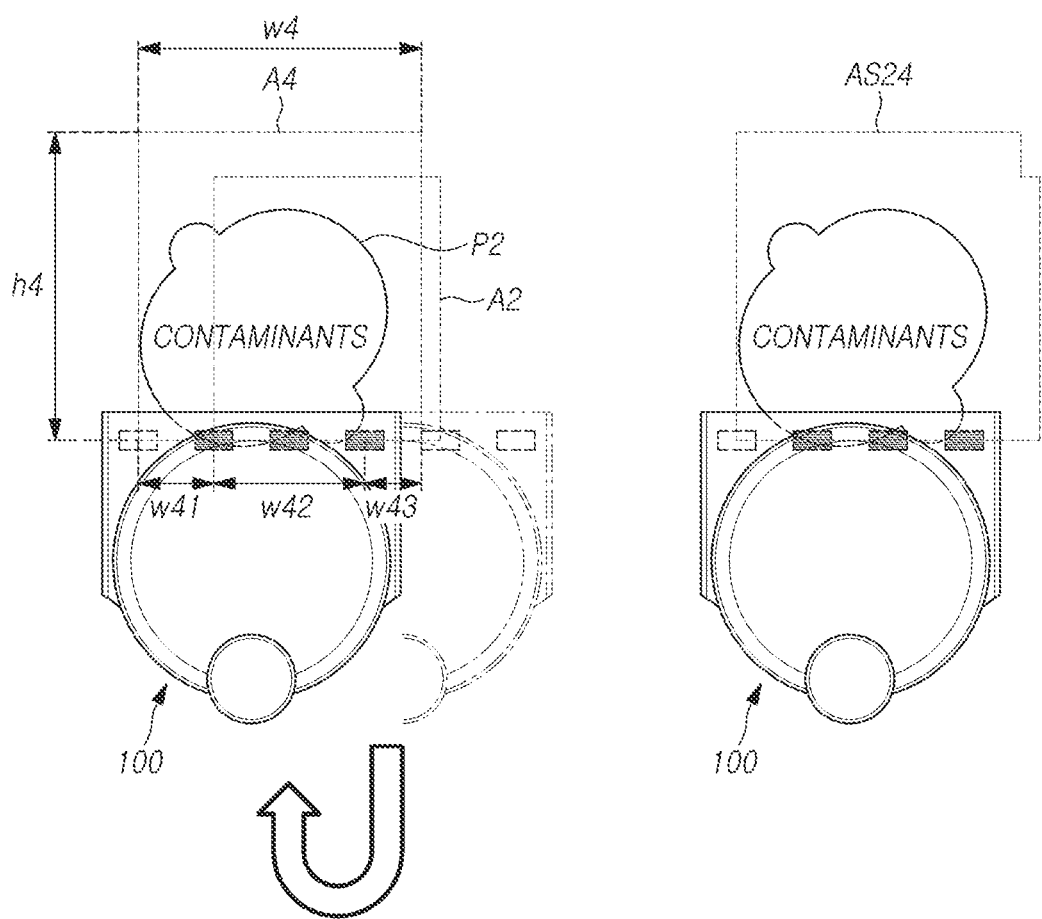
Figure 20:
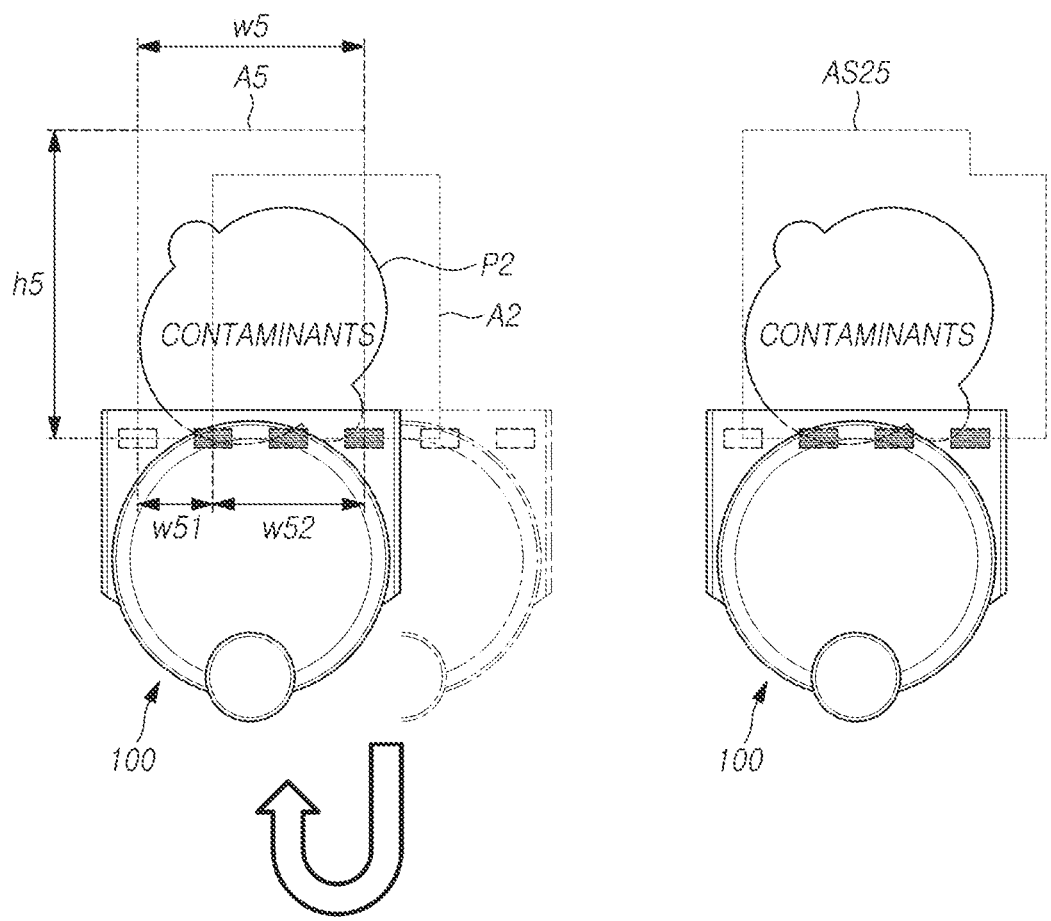

FIGS. 19 and 20 each illustrate a circumstance in which while the robot 100 is moving in the direction in which the outermost moisture sensor 170 is located, the outermost moisture sensor 170 positioned in other direction detects the contaminants P2.

FIG. 19 illustrates a circumstance in which a predetermined marginal length value is assigned in the direction of the outermost moisture sensor 170 positioned in the other direction according to an embodiment of the disclosure, and FIG. 20 illustrates a circumstance in which no marginal length value is assigned in the direction of the outermost moisture sensor 170 positioned in the other direction according to an embodiment of the disclosure.

Referring to FIG. 19, the robot 100 may travel to the left to obtain one or more entry-forbidden areas A2 and A4 in order to set the final entry-forbidden area AS24 for the entire contaminants P2. As such, while moving to the left, the robot 100 may detect the contaminants P2 through the rightmost moisture sensor 170 located in a direction opposite to the moving direction of the robot 100. Since the rightmost moisture sensor 170 also corresponds to any one of the outermost moisture sensors 170, the robot 100 may assign a predetermined marginal length value w43 to the right and obtain a length value w4 of a virtual line including the marginal length value w43. The robot 100 may then obtain the entry-forbidden area A4 using the length value w4 of the virtual line. In other words, the length value w4 of the virtual line for the entry-forbidden area A4 may include a first distance value w41 between the moisture sensor detecting the contaminants P2 and the moisture sensor not detecting the contaminants P2, a second distance value w42 between the two moisture sensors detecting the contaminants P2, and the marginal distance value w43.

When no contaminants P2 are detected by the leftmost moisture sensor 170, in the direction in which the robot 100 travels to set the final entry-forbidden area, the robot 100 may merge all the entry-forbidden areas A2 and A4 accumulated and stored in the memory to generate the final entry-forbidden area AS24. Although FIG. 19 illustrates an example circumstance of merging the two entry-forbidden areas A2 and A4, the entry-forbidden area may be further generated until no contaminants P2 are detected through the leftmost moisture sensor 170, and thus, the number of the entry-forbidden areas to be merged is not limited to two.

Referring to FIG. 20, the robot 100 may travel to the left to obtain one or more entry-forbidden areas A2 and A5 in order to set the final entry-forbidden area for the entire contaminants P2 as is in FIG. 19. As such, the robot 100 moving to the left may detect the contaminants P2 through the rightmost moisture sensor 170 located in the direction opposite to its moving direction. In this case, the robot 100 may not assign any marginal length value (e.g., the marginal length value w43 in FIG. 19) to the right of the rightmost moisture sensor 170. More specifically, the robot 100 may not assign a predetermined marginal length value in the right direction, and may obtain a length value w5 of a virtual line, using a first distance value w51 between the moisture sensor 170 detecting the contaminants P2 and its neighboring moisture sensor 170 not detecting the contaminants P2, and a second distance value w52 between the two moisture sensors detecting the contaminants P2. Accordingly, the length value of the virtual line in the embodiment shown in FIG. 20 may have a shorter length value by the marginal length value (w43 in FIG. 19) than the length value of the virtual line in the embodiment shown in FIG. 19.

Thus, it can be seen from the foregoing description that the final entry-forbidden area AS24 shown in FIG. 19 may be set in a wider range than the final entry-forbidden area AS25 shown in FIG. 20. According to the embodiment of FIG. 19, it will be apparent that there is provided an advantage in that a sufficiently wide entry-forbidden area can be obtained. According to the embodiment of FIG. 20, there is provided another advantage that the entry-forbidden area can be obtained closer to the area corresponding to the actual contaminants P2.

The electronic device according to various embodiments disclosed herein may be one of various types of electronic devices. The electronic devices may include, for example, a display device, a portable communication device (e.g., a smartphone), a computer device, a portable multimedia device, a portable medical device, a camera, a wearable device, or a home appliance. According to an embodiment of the disclosure, the electronic devices are not limited to those described above.

The various embodiments and terms used herein are not intended to limit the technical features described herein to specific embodiments and should be understood to include various modifications, equivalents, or substitutes of the embodiment. It should be understood that the term 'and/or' as used herein is intended to encompass any and all possible combinations of one or more of the enumerated items. As used in the disclosure, the terms such as 'comprise(s)', 'include(s)' 'have/has', 'configured of', etc. are only intended to designate that the features, components, parts, or combinations thereof described in the disclosure exist, and the use of these terms is not intended to exclude the possibility of the presence or addition of one or more other features, components, parts, or combinations thereof. In this document, each of the phrases such as "A or B", "at least one of A and B", "at least one of A or B", "A, B or C", "at least one of A, B and C", and "at least one of A, B, or C" may include any one of the items enumerated together in a corresponding one of the phrases, or all possible combinations thereof. Terms such as "the first", "the second", or "first", or "second" may be used simply to distinguish a corresponding component from another corresponding component, and do not limit the corresponding components in view of other aspect (e.g., importance or order).

The term "module", "part" or "unit" used in various embodiments of the present document may include a unit implemented in hardware, software, or firmware and be used interchangeably with terms such as e.g., logic, logic block, part, component, or circuitry, for example. The module or unit may be a minimum unit or a part of the integrally configured component or the component that performs one or more functions. For example, according to an embodiment, the module or unit may be implemented in the form of an application-specific integrated circuit (ASIC).

The term "in case ~" used in various embodiments of the disclosure, may be construed to mean "when ~" or "when ~", or "in response to determining ~" or "in response to detecting ~", depending on the context. Similarly, the term "when it is determined that ~" or "when it is detected that ~" may be interpreted to mean "upon determining ~" or "in response to determining ~", or "upon detecting ~" or "in response to detecting ~", depending on the context.

The program executed by the robots 100 and 200 described herein may be implemented as a hardware component, a software component, and/or a combination of the hardware component and the software component. The program may be executed by any system capable of executing computer readable instructions.

Software may include a computer program, codes, instructions, or a combination of one or more of these, and may configure a processing unit to perform operations as desired or command the processing unit independently or in combination (collectively). The software may be implemented as a computer program including instructions stored in a computer-readable storage medium. The computer-readable storage medium may include, for example, a magnetic storage medium (e.g., read-only memory (ROM), random-access memory (RAM), floppy disk, hard disk, and so on), an optically readable medium (e.g., compact disc read only memory (CD-ROM), digital versatile disc (DVD), or the like) and so on. The computer-readable storage medium may be distributed among network-connected computer systems, so that the computer-readable code may be stored and executed in a distributed manner. The computer program may be distributed (e.g., downloaded or uploaded) by online, either via an application store (e.g. Play Store™) or directly between two user devices (e.g., smartphones). In the case of online distribution, at least a part of the computer program product may be temporarily stored or temporarily generated in a machine-readable storage medium such as a memory of a server of a manufacturer, a server of an application store, or a relay server.

According to various embodiments, each component (e.g., module or program) of the above-described components may include a singular or a plurality of entities, and some of the plurality of entities may be separated and placed into other components. According to various embodiments, one or more components or operations among the above-described corresponding components may be omitted, or one or more other components or operations may be added thereto. Alternatively or additionally, a plurality of components (e.g., a module or a program) may be integrated into one component. In this case, the integrated component may perform one or more functions of each component of the plurality of components identically or similarly to those performed by the corresponding component among the plurality of components prior to the integration. According to various embodiments, operations performed by a module, program, or other component may be executed sequentially, in parallel, repeatedly or heuristically, or one or more of the operations may be executed in a different order or omitted, or one or more other operations may be added thereto.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A robot comprising:
   a housing forming an external appearance of the robot;
   a cover configured to be coupled at a lowermost part of the housing; and
   two or more sensor structures positioned between the housing and the cover,
   one or more processors; and
   memory storing instructions that, when executed by the one or more processors, individually or collectively, cause the robot to:
   detect contaminants on a front floor surface through at least one of the two or more sensor structures,
   determine a length of a virtual reference line based on a sum of a first length and a second length, the first length comprising a distance between sensor structures, of the two or more sensor structures, that detected contaminants, and
   set an entry-forbidden area including the virtual reference line,
   wherein the length of the virtual reference line is determined based on a number of the two or more sensor structures that have detected contaminants, and
   wherein the second length includes a distance between the sensor structures, of the two or more sensor structures, that detected contaminants and a neighboring sensor structure, of the two or more sensor structures, that has not detected contaminants.

2. The robot according to claim 1,
   wherein a receiving part is provided to correspond to a total number of the two or more sensor structures, and
   wherein at least a portion of the receiving part is positioned at a center of the cover.

3. The robot according to claim 2,
   wherein the receiving part comprises:
   a protecting surface extending downwards from the cover, and
   a supporting surface having a predetermined angle with respect to the protecting surface, and
   wherein the two or more sensor structures are positioned on the supporting surface.

4. The robot according to claim 2,
   wherein at least a portion of the receiving part comprises a supporting surface parallel to a moving direction, and
   wherein the two or more sensor structures are positioned on the supporting surface.

5. The robot according to claim 2,
   wherein the receiving part comprises a recess and a projection for fixing each of the two or more sensor structures, and
   wherein a conductive plate is fastened to an inside of the receiving part by the recess and the projection.

6. The robot according to claim 2,
   wherein the cover comprises at least one guide having a shape protruding downwardly of the cover, and
   wherein the at least one guide and the receiving part are alternatingly arranged.

7. The robot according to claim 1, further comprising:
   at least one wheel; and
   a drive system connected to the wheel to provide a rotational force to the wheel,
   wherein the two or more sensor structures are arranged to be spaced apart from each other in a row along a virtual horizontal reference line orthogonal to a moving reference line connecting a front side and a rear side of the robot.

8. The robot according to claim 1,
   wherein the instructions, when executed by the one or more processors, individually or collectively, further cause the robot to:
   identify a sensor structure, of the two or more sensor structures, that has detected the contaminants, and
   set the entry-forbidden area based on at least one of a position or a number of the identified sensor structure.

9. The robot according to claim 8, wherein the instructions, when executed by the one or more processors, individually or collectively, further cause the robot to:
   based on that the contaminants are detected, move backwards,
   identify a sensing signal on the sensor structure that has detected the contaminants after moving backwards or while moving backwards,
   based on that the sensing signal is identified from the sensor structure that has detected the contaminants, cease the moving, and
   based on that the sensing signal is no longer identified from the sensor structure that has detected the contaminants, resume the moving so as not to pass the entry-forbidden area.

10. The robot according to claim 9, wherein the instructions, when executed by the one or more processors, individually or collectively, further cause the robot to:
based on that all of the two or more sensor structures detect the contaminants in a front side of the robot, set the entry-forbidden area and cease the moving.

11. The robot according to claim 8, wherein, to set the entry-forbidden area, the instructions, when executed by the one or more processors, individually or collectively, further cause the robot to:
obtain a virtual reference line for setting the entry-forbidden area,
obtain two or more residual virtual lines for generating a polygonal area using the virtual reference line,
obtain the polygonal area by connecting the virtual reference line and the residual virtual line, and
set an area corresponding to the polygonal area as the entry-forbidden area.

12. A cleaning robot comprising:
a main body;
a first housing forming an external appearance of the main body;
a second housing coupled to a front of the first housing;
a drive system coupled to both sides of the main body and configured to move the cleaning robot;
a cleaning tool assembly configured to be coupled to a lower part of the second housing;
one or more processors; and
one or more memories storing instructions that, when executed by the one or more processors, individually or collectively, cause the cleaning robot to:
detect contaminants on a front floor surface through at least two sensor structures of a plurality of sensor structures,
determine a length of a virtual reference line based on a sum of a first length and a second length, the first length comprising a distance between the at least two sensor structures, of the plurality of sensor structures, that detected contaminants, and
set an entry-forbidden area including the virtual reference line,
wherein the length of the virtual reference line is determined based on a number of the plurality of sensor structures that have detected contaminants, and
wherein the second length includes a distance between the at least two sensor structures, of the plurality of sensor structures, that detected contaminants and a neighboring sensor structure, of the plurality of sensor structures, that has not detected contaminants,
wherein the cleaning tool assembly comprises:
a cleaning tool;
a cover connected to the cleaning tool, and having an opening for exposing at least part of the cleaning tool; and
the plurality of sensor structures coupled to the cover, and
positioned between the cover and the second housing, and
wherein the plurality of sensor structures comprise a conductive plate and a sensor electrode.

13. The cleaning robot according to claim 12, wherein the cover comprises a receiving part for positioning each sensor structure, of the plurality of sensor structures, in between the cover and the second housing.

14. The cleaning robot according to claim 13, wherein the receiving part is arranged spaced apart from each other to correspond to a total number of the plurality of sensor structures.

15. The cleaning robot according to claim 13, wherein the receiving part comprises:
a protecting surface extending downwards from the cover, and
a supporting surface having a predetermined angle with respect to the protecting surface, and
wherein the sensor structure is positioned on the supporting surface.

16. The cleaning robot according to claim 13, wherein at least a portion of the receiving part includes a supporting surface parallel to a moving direction, and
wherein the sensor structure is positioned on the supporting surface.

17. The cleaning robot according to claim 13, wherein the receiving part includes a recess and a projection for fixing the sensor structure, and
wherein the conductive plate is fastened to an inside of the receiving part by the recess and the projection.

18. The cleaning robot according to claim 14, wherein the instructions, when executed by the one or more processors, individually or collectively, further cause the cleaning robot to:
identify the sensor structure, of the plurality of sensor structures, that has detected the contaminants, and
set an entry-forbidden area based on at least one of a position or a number of the identified sensor structure.

19. A method for controlling a robot or a cleaning robot comprising a housing forming an external appearance, a cover configured to be coupled at a lowermost part of the housing, and a plurality of sensor structures positioned between the housing and the cover, the method comprising:
detecting contaminants on a front floor surface through at least two sensor structures of the plurality of sensor structures;
identifying a sensor structure of the plurality of sensor structures that has detected the contaminants;
determining a length of a virtual reference line based on a sum of a first length and a second length, the first length comprising a distance between the at least two sensor structures, of the plurality of sensor structures, that detected contaminants; and
setting an entry-forbidden area based on at least one of a position or a number of the identified sensor structure including the virtual reference line,
wherein the length of the virtual reference line is determined based on a number of the plurality of sensor structures that have detected contaminants, and
wherein the second length includes a distance between the at least two sensor structures, of the plurality of sensor structures, that detected contaminants and a neighboring sensor structure, of the at least two sensor structures, that has not detected contaminants.

20. The method according to claim 19 further comprising:
based on the contaminants being detected, moving backwards;
identifying a sensing signal on a sensor structure of the plurality of sensor structures that has detected the contaminants after moving backwards or while moving backwards;
based on that the sensing signal is identified from the sensor structure that has detected the contaminants, ceasing the moving; and
based on that the sensing signal is no longer identified from the sensor structure that has detected the contaminants, resuming the moving so as not to pass the entry-forbidden area.

* * * * *